United States Patent
Davis

(10) Patent No.: US 6,618,775 B1
(45) Date of Patent: Sep. 9, 2003

(54) DSP BUS MONITORING APPARATUS AND METHOD

(75) Inventor: Henry A. Davis, Soquel, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/638,461

(22) Filed: Aug. 14, 2000

Related U.S. Application Data

(63) Continuation of application No. 09/026,734, filed on Feb. 20, 1998, now abandoned.
(60) Provisional application No. 60/055,815, filed on Aug. 15, 1997.

(51) Int. Cl.$^7$ .......................... G06F 11/30; G06F 13/00
(52) U.S. Cl. .......................... 710/100; 714/30; 714/45; 712/35
(58) Field of Search .......................... 714/47, 30, 25, 714/40, 45, 39; 710/52, 100, 305; 712/33, 35; 717/128, 129; 713/502; 345/10, 700

(56) References Cited

U.S. PATENT DOCUMENTS

| | | | |
|---|---|---|---|
| 5,142,673 A | 8/1992 | DeAngelis et al. | 395/575 |
| 5,210,862 A | 5/1993 | DeAngelis et al. | 395/575 |
| 5,313,618 A | 5/1994 | Pawloski | 395/500.49 |
| 5,325,368 A | 6/1994 | James et al. | 714/727 |
| 5,329,471 A | 7/1994 | Swoboda et al. | 395/500.44 |
| 5,355,369 A | 10/1994 | Greenberger et al. | 714/724 |
| 5,371,551 A | 12/1994 | Logan et al. | 348/571 |
| 5,375,228 A | 12/1994 | Leary et al. | 710/33 |
| 5,463,760 A | 10/1995 | Hamauchi | 395/500.49 |
| 5,488,688 A | 1/1996 | Gonzales et al. | 710/34 |
| 5,513,338 A | 4/1996 | Alexander et al. | 395/500.49 |
| 5,530,804 A | 6/1996 | Edgington et al. | 710/30 |
| 5,535,412 A | 7/1996 | Nadehara | 711/110 |
| 5,539,901 A | 7/1996 | Ramirez | 395/500.49 |
| 5,544,311 A | 8/1996 | Harenberg et al. | 714/40 |
| 5,546,566 A | 8/1996 | Katsuta | 395/500.49 |
| 5,560,036 A | 9/1996 | Yoshida | 395/500.44 |
| 5,561,761 A | 10/1996 | Hicok et al. | 714/30 |
| 5,566,303 A | 10/1996 | Tashiro et al. | 710/100 |
| 5,590,354 A | 12/1996 | Klapproth et al. | 714/30 |
| 5,610,826 A | 3/1997 | Whetsel | 364/487 |
| 5,621,651 A | 4/1997 | Swoboda | 395/500.44 |
| 5,623,673 A | 4/1997 | Gephardt et al. | 710/260 |
| 5,631,910 A | 5/1997 | Nozuyama et al. | 714/724 |
| 5,640,542 A | 6/1997 | Whitsel et al. | 395/500.49 |
| 5,671,172 A | 9/1997 | Britton | 365/45 |
| 5,729,678 A | 3/1998 | Hunt et al. | 395/183.19 |
| 5,812,830 A | * 9/1998 | Naasch-Shahry et al. | |
| 5,908,392 A | 6/1999 | Wilson et al. | 600/509 |
| 5,960,457 A | 9/1999 | Skrovan et al. | 711/146 |
| 5,999,163 A | 12/1999 | Ivers et al. | 345/134 |
| 6,026,503 A | * 2/2000 | Gutgold et al. | |

OTHER PUBLICATIONS

Duane R. Aadsen, Harold N. Scholz, and Yervant Zorian; *Automated Bist for Regular Structures Embedded in Asic Devices: AT& T Technical Journal* May/Jun. 1990; pp. 97–109.

(List continued on next page.)

Primary Examiner—Gopal C. Ray
(74) Attorney, Agent, or Firm—Gazdzinski & Associates

(57) ABSTRACT

A bus monitor is provided as a tool for developing, debugging and testing a system having an embedded processor. The bus monitor resides within the same chip or module as the processor, which allows connection to internal processor buses not accessible from external contacts. The monitor uses a separate circular buffer to continuously store, in real-time, data traces from each of one or more internal processor buses. Upon the occurrence of a trigger condition, storage stops and a trace is preserved. Trigger conditions can depend on events occurring on multiple buses and are downloaded via an interface from an external device. Data traces are uploaded via the interface to an external device for evaluation of processor operation.

13 Claims, 18 Drawing Sheets

OTHER PUBLICATIONS

D. Mukherjee, C. Njinda and M.A. Breuer, *Synthesis of Optimal 1–Hot Coded On–Chip Controllers for BIST Hardware; IEEE International Conference on Computer–Aided Design*; Nov. 1991; pp. 236–239.

IEEE Computer Society; *IEEE Standard Test Access Port and Boundary–Scan Architecture*; Oct. 1993.

Debaditya Mukherjee, Massoud Pedram, and Melvin Breuer, *Merging Multiple FSM Controllers for DFT/BIST Hardware; IEEE/ACM International Conference on Computer–Aided Design*; Nov. 1993; pp. 720–725.

Vishvani D. Agrawal, Chih–Jen Lin, Paul W. Rutkowski, Shianling Wu, and Yervant Zorian; *Built–in Self–Test for Digital Integrated Circuits; AT& T Technical Journal*; Mar./Apr. 1994; pp. 30–39.

Sybille Hellebrand, Hans–Joachim Wunderlich; *An Efficient Procedure for the Synthesis of Fast Self–Testable Controller Structures; IEEE/ACM International Conference on Computer–Aided Design*; Nov. 1994; pp. 110–116.

Albrecht P. Stroele and Hans–Joachim Wunderlich; *Test Register Insertion with Minimum Hardware Cost; IEEE/ACM International Conference on Computer–Aided Design*; Nov. 1995; pp. 95–101.

Takeshi Ikenaga and Takeshi Ogura; *A Distributed BIST Technique and Its Test Design Platform for VLSIs; IECE Trans. Electron*; vol. E78–C, No. 11; Nov. 1995; pp. 1618–1623.

Miodrag Potkonjak, Sujit Dey, Kazutoshi Wakabayashi, *Design–For–Debugging of Application Specific Designs; IEEE/ACM International Conference on Computer–Aided Design*; Nov. 1995; pp. 295–301.

Dan Strassberg; *BIST: Pie in the Sky No Longer; EDN*; Sep. 1996; pp. 77–85.

Karim Arabi, Bozena Kaminska and Janusz Rzeszut; *BIST for D/A and A/D Converters; IEEE Computer Society*; Winter 1996; pp. 49–49.

*The Right Tools Do the Best Jobs; EDN*; Jun., 1997; pp. S•10—S•21.

\* cited by examiner

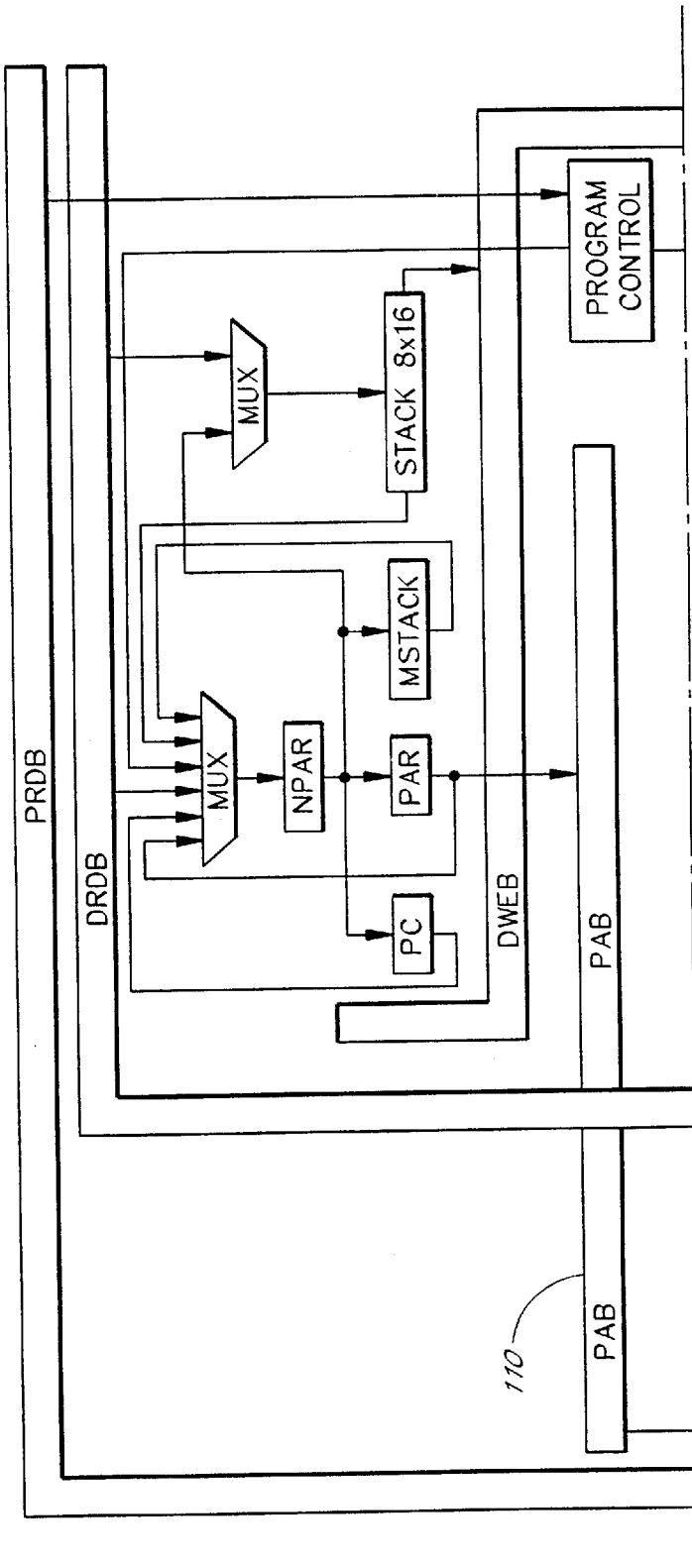

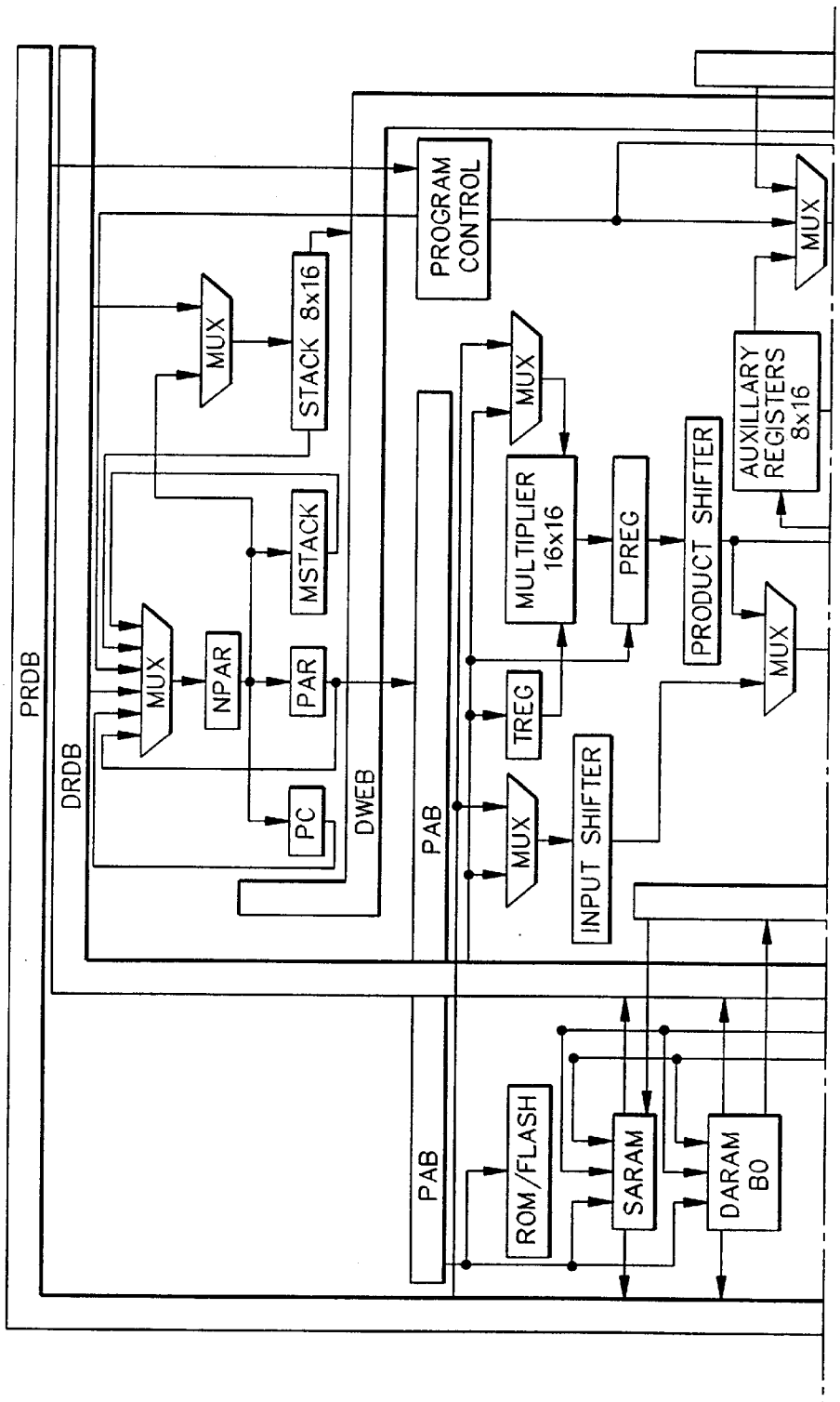

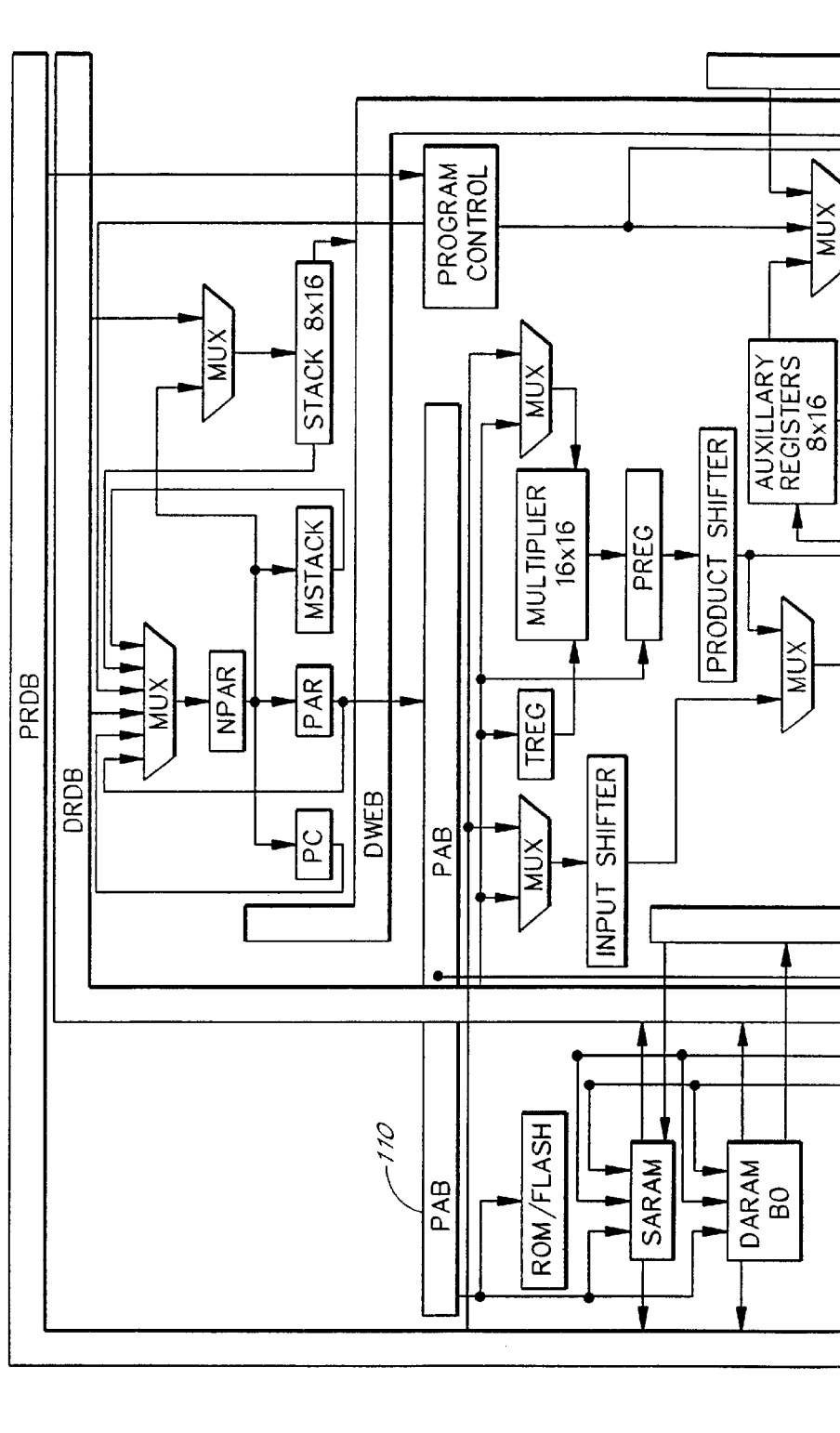

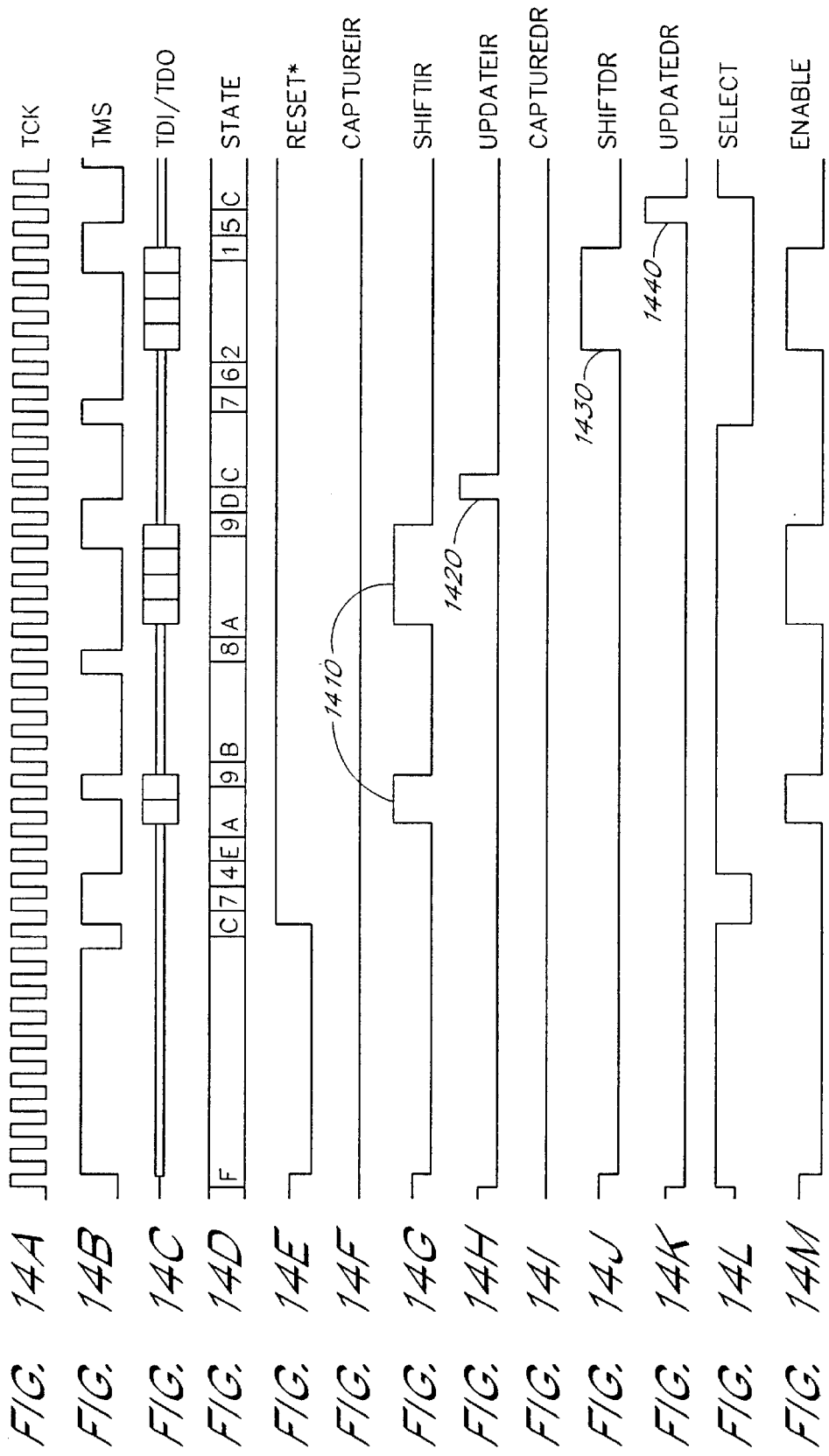

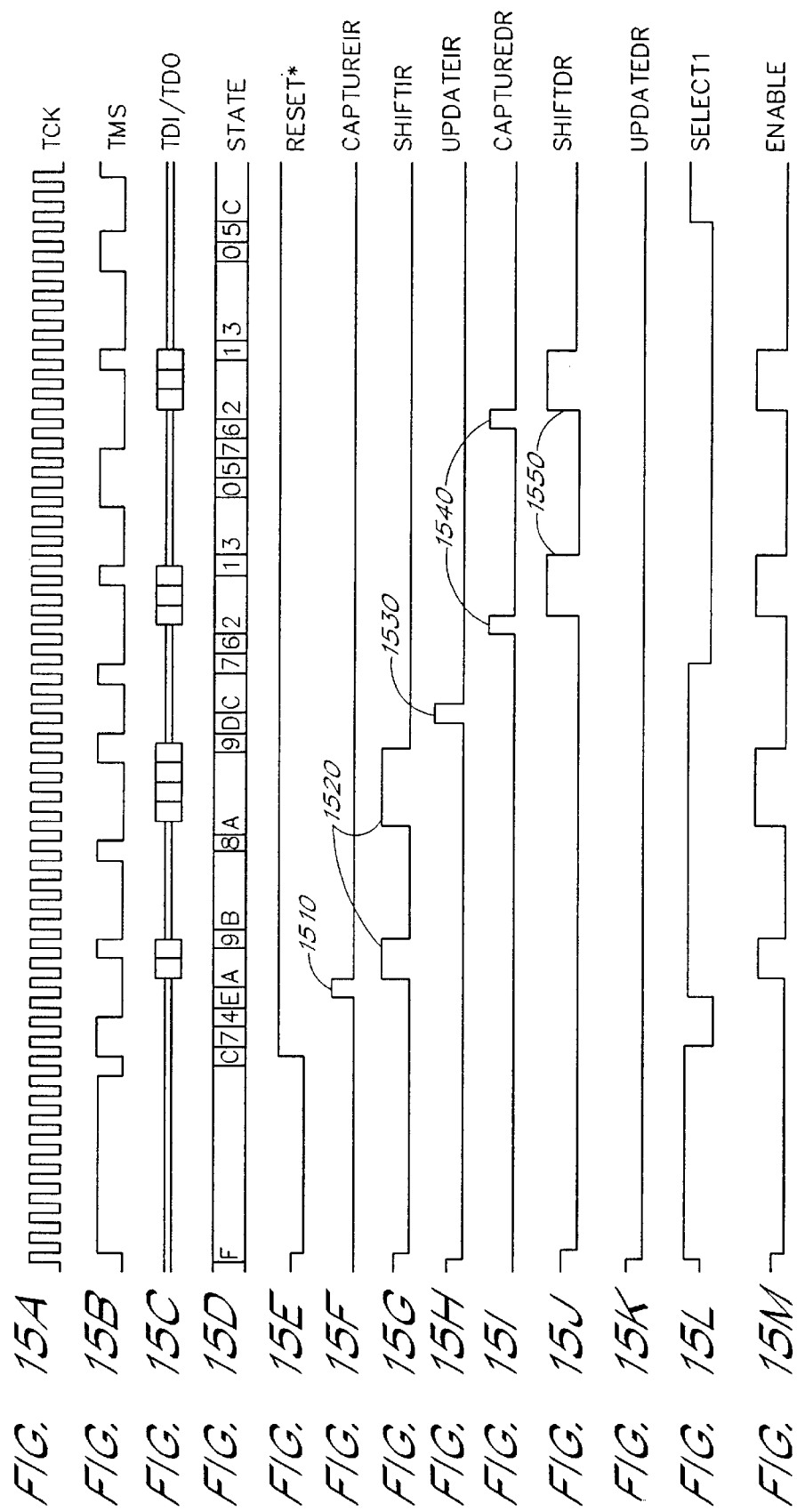

DSP BUS MONITORING APPARATUS AND METHOD

CROSS-REFERENCE TO RELATED APPLICATION

This application is a continuation of U.S. patent application Ser. No. 09/026,734 filed Feb. 20, 1998 entitled "DSP Bus Monitoring Apparatus And Method", abandoned.

Pursuant to 35 U.S.C. §119(e), this application claims the priority benefit of provisional application No. 60/055,815 filed Aug. 15, 1997.

BACKGROUND OF THE INVENTION

1. Field of the Invention

The present invention is in the field of development, debugging and testing tools for systems utilizing embedded processors.

2. Description of the Related Art

A broad selection of debugging tools traditionally have been available for the design and development of systems utilizing embedded microprocessors and microcontrollers. The use of these tools has been extended to the development of systems utilizing specialized processors such as reduced instruction set computers (RISC), co-processors and digital signal processors (DSP). Processor development tools have included hardware-oriented devices, such as in-circuit emulators and logic analyzers, and software-oriented devices, such as ROM monitors. Also included are on-chip debuggers, which fall somewhere between in-circuit emulators and ROM monitors.

A full-featured in-circuit emulator is the most powerful debugging tool. Connection between the emulator and the target system is accomplished with a pod that replaces the target system processor or fits on top of it. The emulator provides its own memory which overlays the target's RAM or ROM. Emulation allows single-step program execution, breakpoints, access to register and memory values, and the capture of program traces.

Logic analyzers are general purpose tools typically used to troubleshoot logic circuits, allowing the capture of logic state or timing traces upon the occurrence of a triggering event. While an emulator replaces the target system processor, a logic analyzer can be connected to a processor's external signals and used to passively monitor processor operation. Logic analyzers conventionally utilize probes which lock on and electrically attach to the microprocessor external pins. Unlike emulators, on-chip debuggers or ROM monitors, a logic analyzer requires no target resources. On the other hand, a logic analyzer only passively monitors the processor, and another tool is necessary for run control, memory and register reads and writes and code downloading.

A ROM monitor is essentially application code that resides in target ROM. Unlike an emulator, a ROM monitor runs on the target and needs significant target resources, such as an interrupt, a communication port and a RAM. A ROM monitor can provide run control, memory and register reads and writes and code downloading. On-chip debuggers are tools which take advantage of the on-chip debugging features found in some processors. A processor's on-chip debugging features are accessed through one or more dedicated pins. These features are typically debug registers implemented on the processor or special debug registers reserved for use by an on-chip debugger. Higher-level debugging features are provided by host-based debugger packages. These debugger packages can be used for single-stepping and setting breakpoints, reading and writing registers and memory, code downloading and resetting the processor.

Today's fast, complex processors make it harder to debug embedded systems using these traditional tools. To begin with, modem processors which incorporate superscalar program execution, on-chip program and data caches and multiple address and data buses have logic states that cannot be easily determined by accessing external device pins. FIG. 1 is a block diagram of a prior art digital signal processor (DSP) illustrating a complex architecture with multiple internal buses, including a program address bus (PAB) 110, a program read data bus (PRDB) 120, a data write address bus (DWAB) 130, a data write data bus (DWEB) 140, a data read address bus (DRAB) 150, and a data read data bus (DRDB) 160. FIG. 2 is a block diagram of another prior art DSP also illustrating a complex architecture with multiple internal buses, including a data memory address (DMA) bus 210, a data memory data (DMD) bus 220, a program memory address (PMA) bus 230, and a program memory data (PMD) bus 240.

Performance improvements in modem processors, such as increased clock rates and internal clock multiplication, also make debugging these embedded systems more difficult. The high frequency signals of many modem processors cannot tolerate the. capacitance associated with pod or probe assemblies and their associated cabling. Further, modem packaging techniques utilized to accommodate higher frequencies, such as surface mount devices, are not amenable to probe attachment. In addition, real-time circuits cannot be halted or slowed without altering the results.

Current debugging techniques are greatly restricted. Modern processors typically provide only a few dedicated serial pins through which registers can be initially set, processor execution started and registers can be examined. However, this greatly restricts the ability to monitor the internal processor states, hampering the development process. There is a need to provide non-invasive state monitoring capability on a processor chip to facilitate processor development.

SUMMARY OF THE INVENTION

A bus monitor is co-located with a processor on a chip or within a module. The bus monitor includes an interface, a bus watching circuit and a memory. The interface provides a connection between the external contacts of the chip or module package and the bus monitor. The interface has an input which allows trigger conditions to be downloaded from an external device to the bus monitor. The interface also has an output which allows a captured trace of bus states to be uploaded to an external device. The bus watching circuit monitors the data on at least one of the processor buses, producing a trigger output when a triggering event matches the downloaded trigger condition. The memory stores data from at least one of the processor buses in response to the bus watching circuit trigger output, creating a trace of states occurring on a bus. The memory also reads trace data from its storage to the interface output.

Another aspect of the current invention is a method of monitoring processor bus states occurring on at least one of a plurality of internal processor buses. The method involves downloading a trigger condition from an external device to the bus monitor. The downloaded trigger condition is compared with events occurring on monitored buses. In response to a comparison match, a trace of bus data is retained in storage. This trace data is then uploaded to an external device for analysis.

BRIEF DESCRIPTION OF THE DRAWINGS

FIG. 1, comprising FIGS. 1A–1B, is a block diagram of a prior art DSP processor illustrating a multiple internal bus architecture;

FIG. 3, comprising FIGS. 3A–3B, is a block diagram of a basic bus monitor according to the present invention as applied to the DSP processor illustrated in FIGS. 1A–1B;

FIG. 5, comprising FIGS. 5A–5B, is a block diagram of a bus monitor with enhanced features including the monitoring of multiple buses and state tracing of multiple buses;

FIG. 14, comprising FIGS. 14A–14M is a timing diagram illustrating the downloading of trigger point data through the external interface; and FIG. 15, comprising FIGS. 15A–15M is a timing diagram illustrating the uploading of status and bus trace data through the external interface.

DETAILED DESCRIPTION OF THE PREFERRED EMBODIMENTS

A. Processor Integrated Bus Monitoring

The bus monitoring apparatus and method of the current invention regards the non-invasive monitoring of internal processor bus states while the processor is executing a program in real-time. In particular, the bus monitor is implemented on the same "chip" or within the same module as the processor. The bus monitor according to the present invention "watches" a particular processor bus for the occurrence of a triggering event. When such an event occurs, data is read from a processor bus and stored in a memory. This memory is eventually read to an external device and analyzed.

Figure 1B:
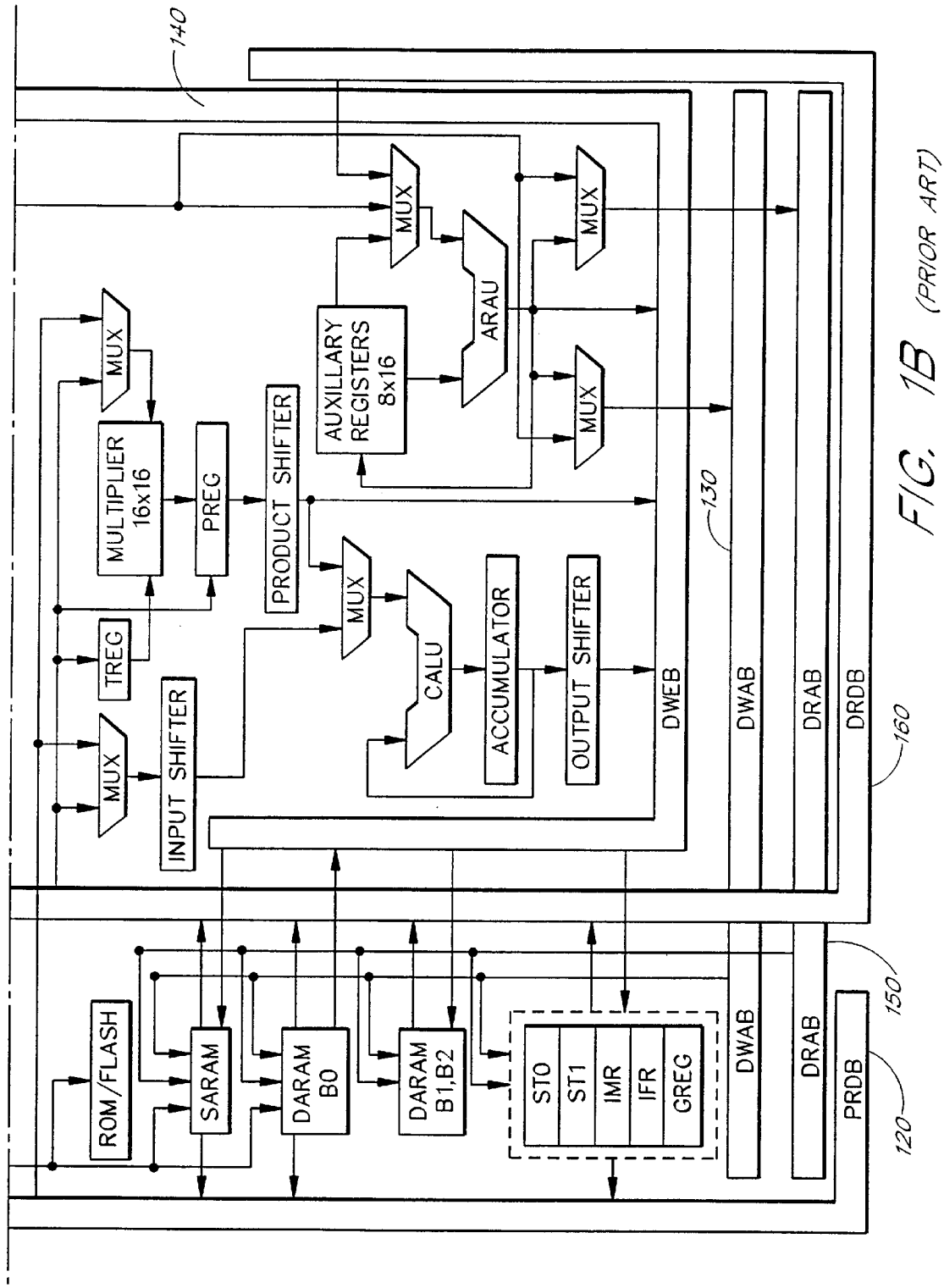
Figure 2:
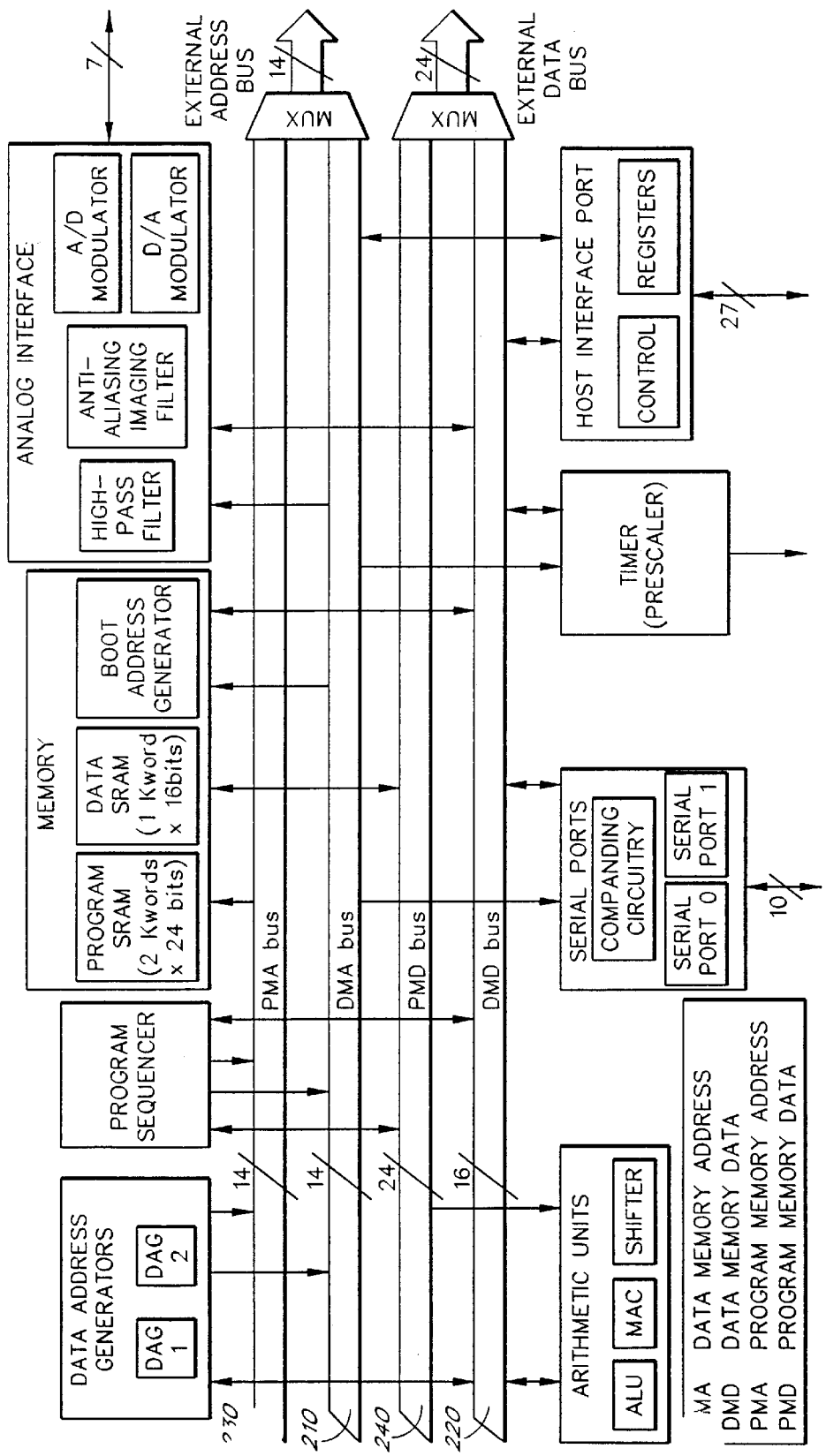
FIG. 2 is a block diagram of another prior art DSP processor, also illustrating a multiple internal bus architecture.
Figure 3B:
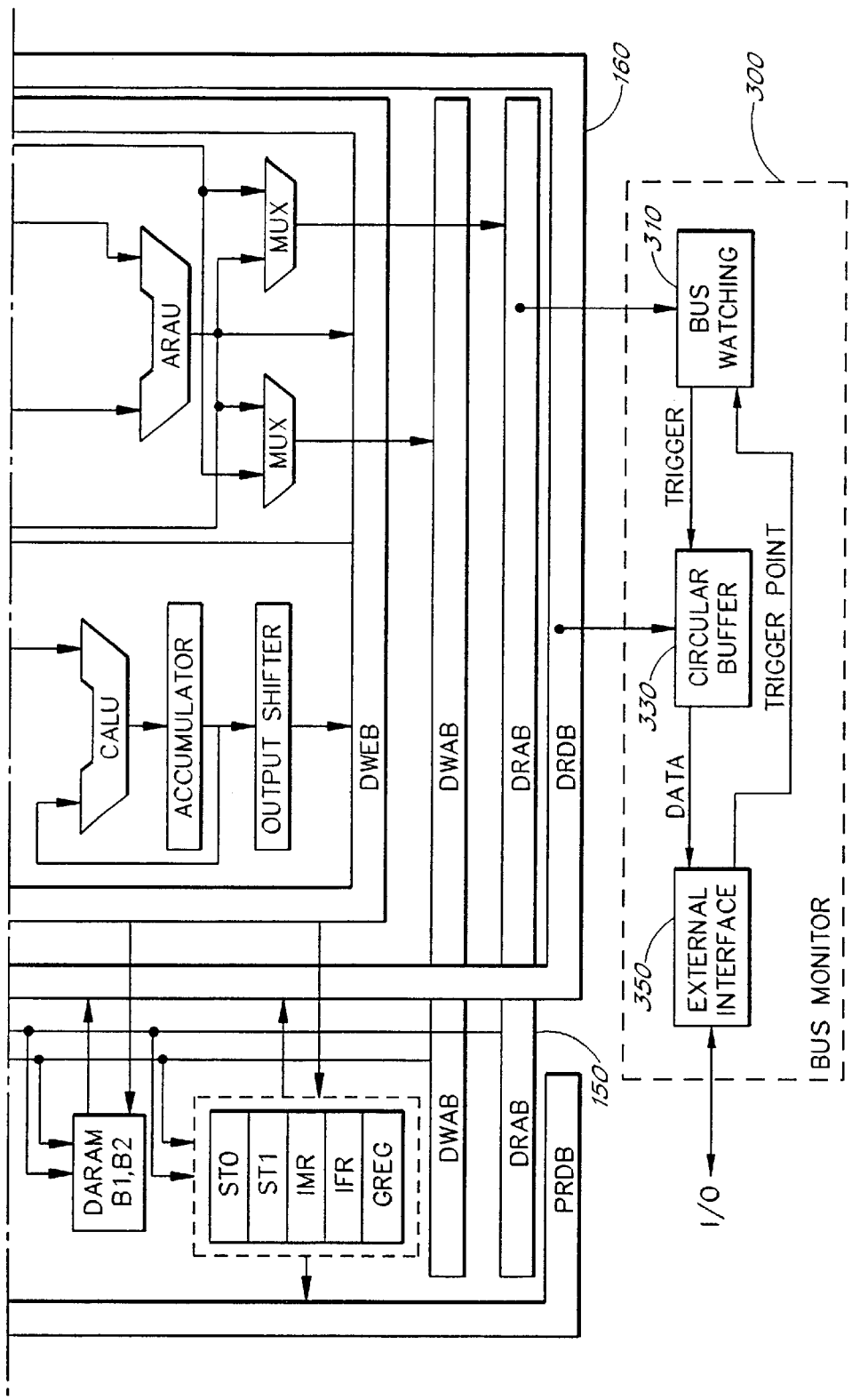
Figure 4:
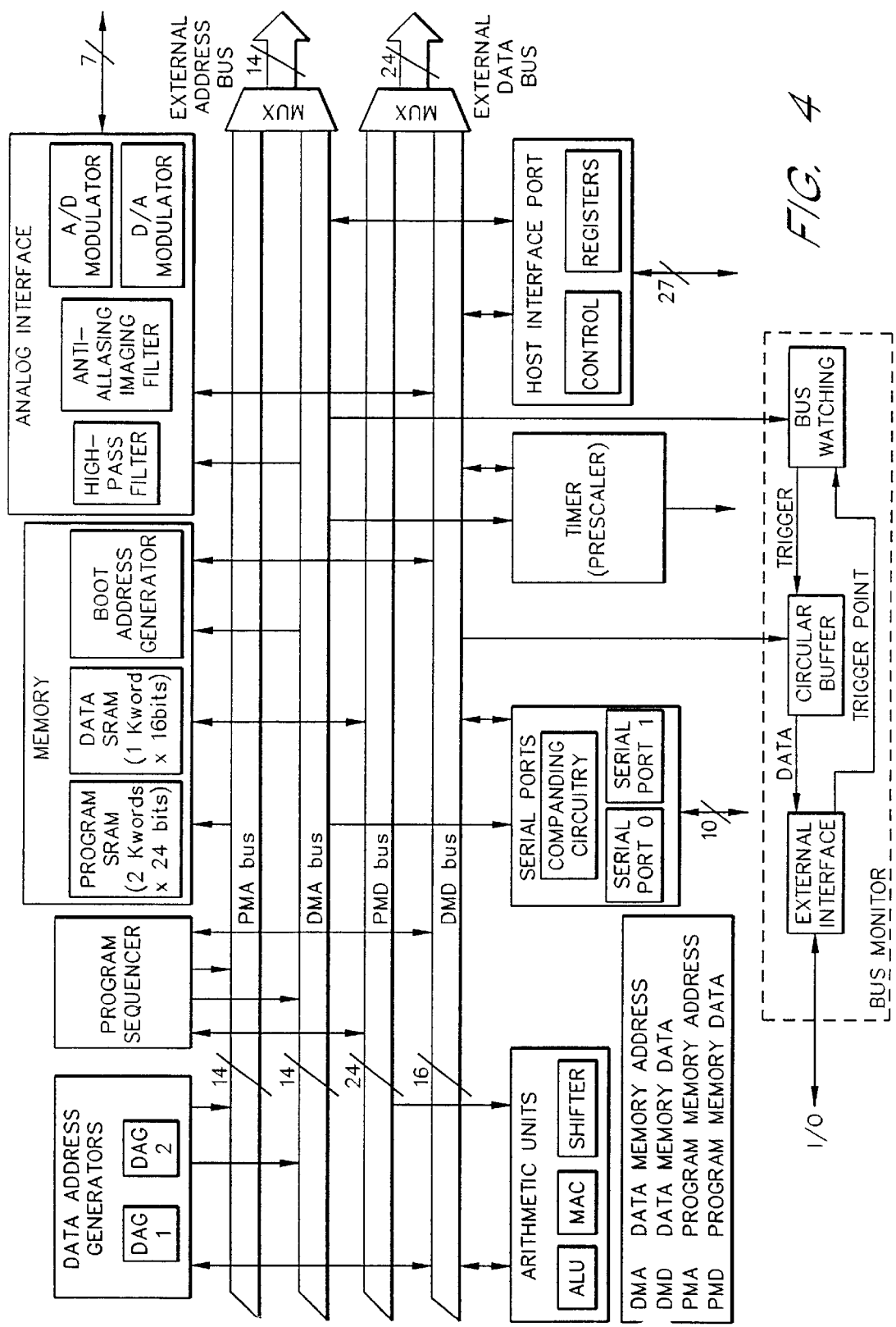
FIG. 4 is a block diagram of a basic bus monitor according to the present invention as applied to the DSP processor illustrated in FIG. 2.

FIGS. 3A–3B show a block diagram of the DSP of FIGS. 1A–1B incorporating a bus monitor according to the present invention. FIG. 4 shows a block diagram of the DSP of FIG. 2 incorporating a bus monitor according to the present invention. Referring to FIG. 3, the bus monitor 300 includes bus watching circuitry 310, a circular buffer 330, and an external interface 350. The bus watching circuitry 310 determines the occurrence of a triggering event on one or more processor buses. The circular buffer 330 acts as the memory which stores bus data as a function of a triggering event. The external interface 350 allows a trigger condition to be downloaded to the bus monitor from an external device, such as a PC, and allows bus trace data to be uploaded from the bus monitor to an external device.

In one case, the bus monitor comprises a bus watching circuit which monitors conditions occurring on a single processor bus to trigger a circular buffer which stores data from a single processor bus. FIG. 3 illustrate this particular example where the bus watching circuitry 310 monitors conditions occurring on the DRAB bus 150 to trigger a trace of events occurring on the DRDB bus 160. The triggering event can, for example, occur when a value on a single bus is greater than, less than, or equal to a given value.

Figure 5B:
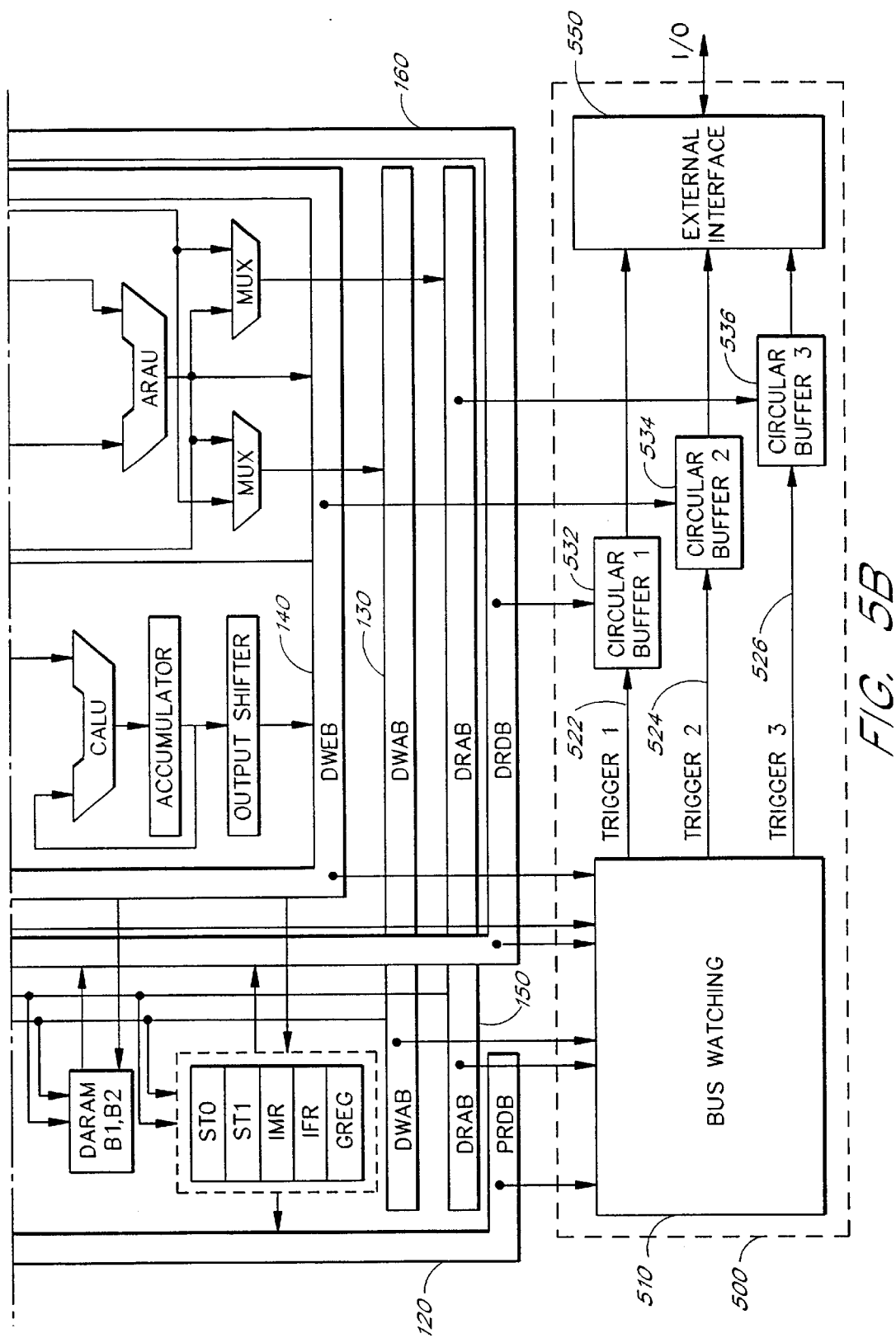

The bus monitor can be more sophisticated than watching a single bus to trigger data capture from a single bus. The bus watching circuit can monitor multiple buses and generate multiple triggers for the capture of data from multiple buses. For example, FIG. 5 illustrate a bus monitor 500 where the bus watching circuit 510 monitors six different DSP buses 110–160 and generates triggers 522, 524, 526 to three different circular buffers 532, 534, 536. These circular buffers capture data traces from three different DSP buses 140, 150, 160. If the bus watching circuitry is used to monitor multiple buses, the trigger event can be more complex than the example described above with respect to FIG. 3. For example, the triggering event can be a corresponding occurrence of an even value on an address bus and a specific operation code on an instruction bus.

B. Bus Monitor Circuitry

Figure 6:
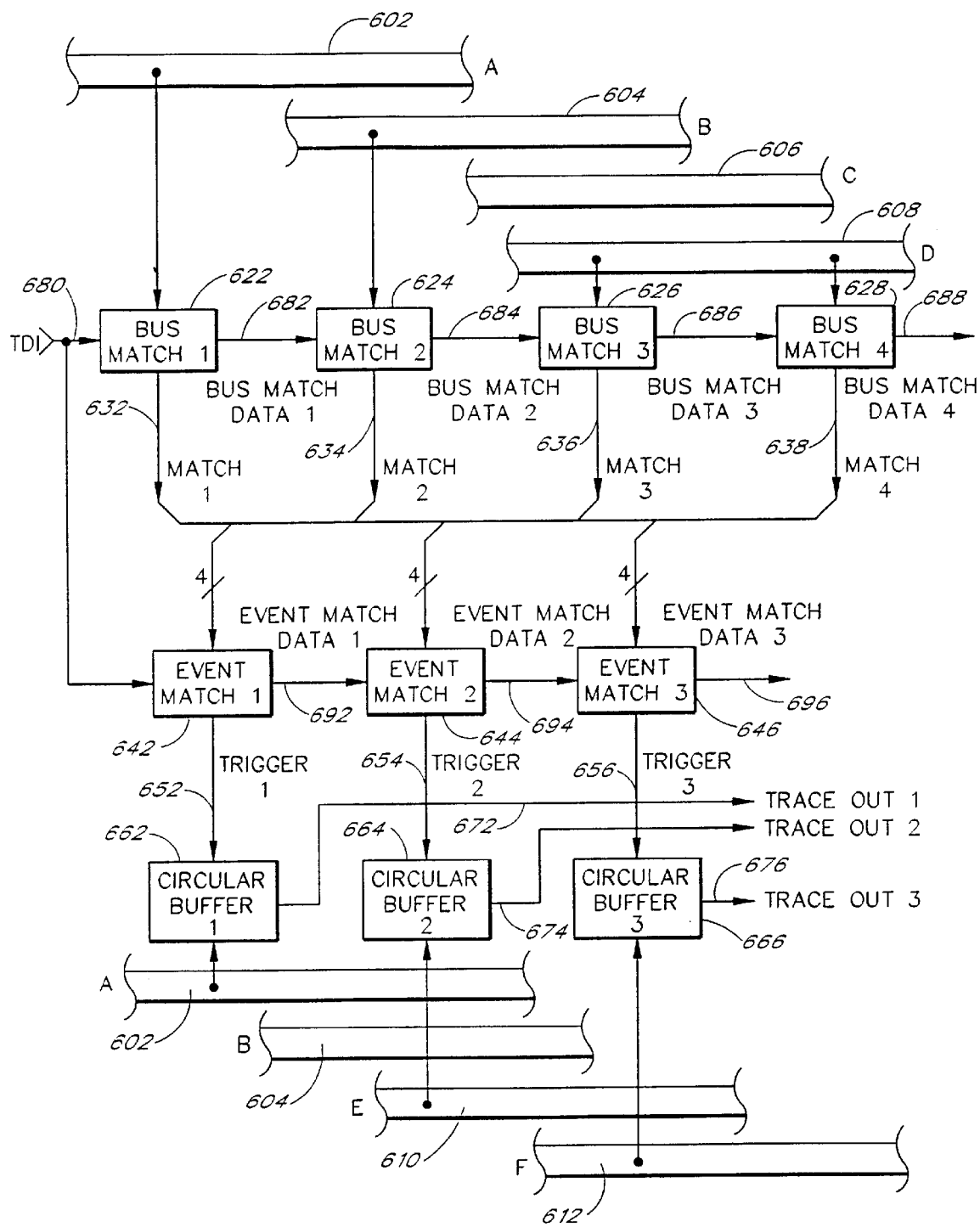
FIG. 6 is a detailed block diagram of a preferred embodiment of the bus monitor.

FIG. 6 shows a detailed block diagram of a preferred embodiment of the bus monitor. The bus watching circuitry includes multiple bus matching functions and event matching functions to generate multiple circular buffer triggers. Each bus match circuit monitors a bus to determine the occurrence of a particular bus event, generating a "match" signal in response. A particular processor bus may be connected to zero, one or multiple bus match circuits. For example, FIG. 6 illustrates six processor buses A–F. Bus A 602 is monitored by the bus match 1 circuit 622 which generates the MATCH 1 signal 632. Bus B 604 is monitored by the bus match 2 circuit 624 which generates the MATCH 2 signal 634. Bus C 606 is unmonitored. Bus D 608 is monitored by both the bus match 3 626 and bus match 4 628 circuits which generate the MATCH 3 636 and MATCH 4 638 signals, respectively. Buses E 610 and F 612 are also unmonitored.

Multiple event match circuits are each connected to the match signals which are output from the bus match circuits. Each event match circuit responds to a particular combination of these match signals to generate a trigger signal to a particular circular buffer. Referring again to FIG. 6, match signals MATCH 1 632, MATCH 2 634, MATCH 3 636 and MATCH 4 638 are routed to each of three event match circuits, event match 1 642, event match 2 644, and event match 3 646. Each of these event match circuits, in response to its particular combination of these four match signals, generates one of the three independent trigger signals, TRIGGER 1 652, TRIGGER 2 654 and TRIGGER 3 656. Each of these trigger signals are connected to its corresponding circular buffer, which is one of circular buffer 1 662, circular buffer 2 664 or circular buffer 3 666.

These circular buffers each are connected to a processor bus and continually store valid data from a bus until a trigger signal is detected. Each circular buffer responds to its trigger signal input to stop the storage of data from its particular processor bus. Referring again to FIG. 6, circular buffer 1 662 stores data from processor bus A 602 until detecting TRIGGER 1 652, circular buffer 2 664 stores data from processor bus E 610 until detecting TRIGGER 2 654, and circular buffer 3 666 stores data from processor bus F 612 until detecting TRIGGER 3 656. In this example, data is not stored from processor buses B 604, C 606 and D 608.

After detecting a trigger signal, trace data obtained from a processor bus is retained in a circular buffer until it is uploaded to an external device or until the buffer is reset. Continuing to refer to FIG. 6, bus data is read from circular buffer 1 662 via the TRACE OUT 1 672 output, bus data is read from circular buffer 2 664 via the TRACE OUT 2 674 output, and bus data is read from circular buffer 3 666 via the TRACE OUT 3 676 output.

The bus monitor also provides inputs for trigger conditions, which include bus match and event match conditions, to be downloaded to the bus monitor from an external device. Still referring to FIG. 6, an input downloads data to each of the bus match and event match circuits. In this example, the bus match circuits are chained together with serial data paths BUS MATCH DATA 1–4 682–688. Externally originating data specifying a bus match condition is serially shifted onto the TDI 680 line, into and through the Bus Match 1 circuit 622, and onto the BUS MATCH DATA 1 682 line. This data continues to shift from the BUS MATCH DATA 1 682 line, into and through the Bus Match 2 624 circuit, and onto the BUS MATCH DATA 2 684 line. As bus match condition data continues to be downloaded to the bus monitor, it shifts from the BUS MATCH DATA 2 684 line, into and through the Bus Match 3 626 circuit, and onto the BUS MATCH DATA 3 686 line. Finally, as bus match conditions continue to be externally downloaded, this data shifts from the BUS MATCH DATA 3 686 line and into the Bus Match 4 circuit 628. This downloading process continues until the bus match condition data has been fully shifted into each of the bus match circuits. A BUS MATCH DATA 4 688 output data path is optionally provided so that test data can be shifted through the bus match circuits to an external interface so that an external device can verify proper operation of these circuits.

Continuing to refer to FIG. 6, the TDI 680 input also downloads event condition data to the event match circuits in a similar manner as for the bus match circuits. In this example, the event match circuits are chained together with serial data paths EVENT MATCH DATA 1–3 692–696. Externally originating data specifying an event match condition is serially shifted onto the TDI 680 line, into and through the event match 1 circuit 642, and onto the EVENT MATCH DATA 1 692 line. This data continues to shift from the EVENT MATCH DATA 1 692 line, into and through the event match 2 644 circuit, and onto the EVENT MATCH DATA 2 694 line. Finally, as event condition data continues to be downloaded to the bus monitor, it shifts from the EVENT MATCH DATA 2 694 line and into the event match 3 646 circuit. This downloading process continues until the event match condition data has been fully shifted into each of the event match circuits. An EVENT MATCH DATA 3 696 output data path is provided so that test data can be shifted through the event match circuits to verify proper operation of these circuits.

The preferred embodiment of the bus monitor has been disclosed as having four bus match circuits, three event match circuits and three circular buffers. One of ordinary skill in the art will appreciate that the bus monitor may have greater than or less than this number of bus match, event match and circular buffer circuits.

1. Bus Match Circuit

Figure 7:
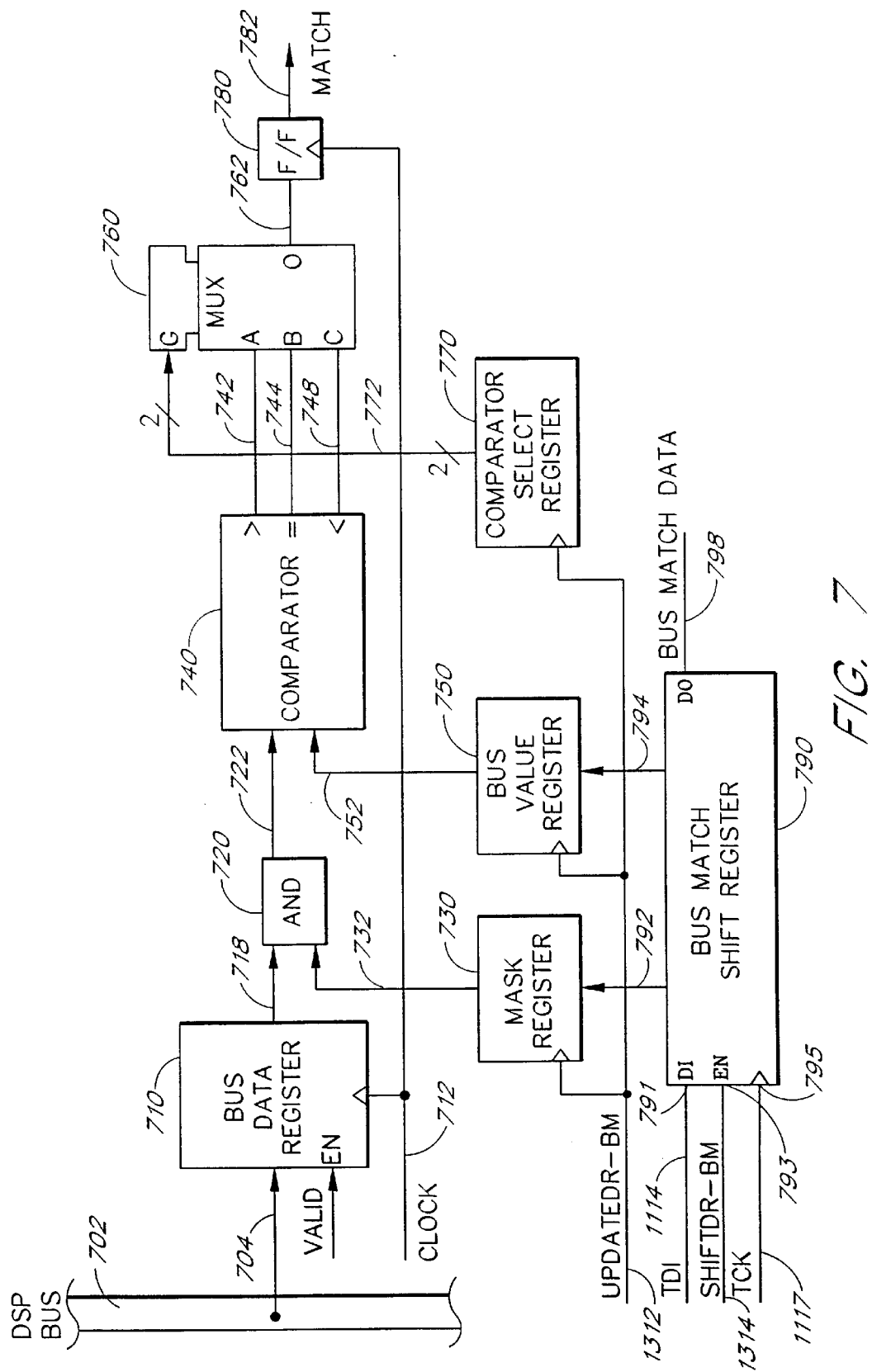
FIG. 7 is a detailed block diagram of a preferred embodiment of the bus matching portion of the bus watching circuit for the bus monitor.

Referring to FIG. 6, the preferred embodiments of the bus match circuits, bus match 1–4 622–628, are each the same, but their input and output signals are different. FIG. 7 illustrates a detailed block diagram of a preferred embodiment of a typical one of the bus match circuits described above with respect to FIG. 6. FIG. 7 shows that the bus match circuit monitors a particular DSP bus 702 and generates a MATCH signal 782 if data on the DSP bus satisfies a bus match condition. Data inputs 704 from the bus are strobed with a CLOCK signal 712 and a VALID clock enable signal 714 into a bus data register 710, where the CLOCK 712 and the VALID 714 signals are DSP-derived signals which indicate when valid data is available on the bus. A bit-wise "AND" function 720 is then performed between the bus data register outputs 718 and the outputs 732 of a mask register 730. In this manner, specified bits on the bus 702 can be masked-out or ignored. A comparator function 740 is then performed between the masked bus data 722 and the outputs 752 of a bus value register 750. The comparator 740 has outputs>742, =744, <748 which are asserted when the bus data is either greater than, equal to, or less than the value in the bus value register 750, respectively. The outputs 772 of a comparator select register 770 select one of these comparator outputs 742–748 via a multiplexer 760. A flip-flop 780 synchronously latches the selected comparator output 762 with the CLOCK 712 and, if the comparator output 762 is true, the MATCH signal 782 is asserted.

The mask 730, bus value 750 and comparator select 770 registers are loaded with an UPDATEDR-BM strobe signal 1312 from the output of a bus match shift register 790. The bus match shift register 790 is externally downloaded as described above with respect to FIG. 6. Specifically, for the first stage bus match circuit, corresponding to bus match 1 622 of FIG. 6, the TDI signal 1114 on the data input 791 of the shift register 790 is shifted into this register upon assertion of SHIFTDR-BM 1314 on the shift enable input 793. The TDI signal 1114 is externally-derived serial data, as described below. This data is shifted through the shift register 790 and then to the BUS MATCH DATA output 798 synchronously with the externally derived clock signal, TCK 1117, on the shift register clock input 795. The BUS MATCH DATA output 798 is the data input 791 of the second stage bus match circuit, corresponding to bus match 2 624 of FIG. 6. The BUS MATCH DATA output 798 of the last stage bus match circuit corresponds to BUS MATCH DATA 4 688 of FIG. 6.

One of ordinary skill in the art will recognize that many other embodiments of a bus matching circuit having similar functions to the preferred embodiment disclosed above are feasible. Further, embodiments of a bus matching circuit having enhanced functions are also feasible. For example, a counter could be added to the circuit shown in FIG. 7 in order that a MATCH signal is generated only if multiple matches, as determined by the counter, have occurred.

2. Event Match Circuit

Figure 8:
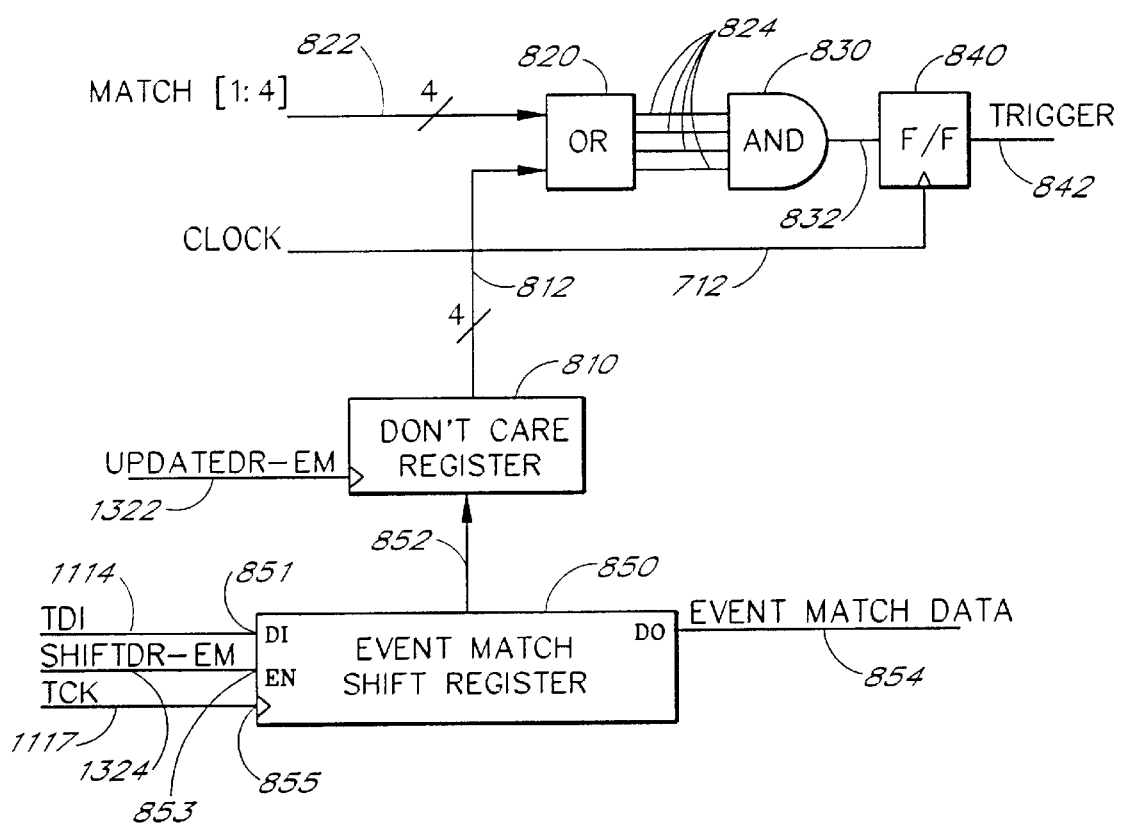
FIG. 8 is a detailed block diagram of a preferred embodiment of the event matching portion of the bus watching circuit for the bus monitor.

FIG. 8 illustrates a detailed block diagram of a preferred embodiment of an event match circuit. In general, the event match circuit generates a TRIGGER signal 842 on the synchronized occurrence of one or more matching conditions as determined by the bus matching circuits described above. Referring to FIG. 8, the outputs 812 of a don't care register 810 are bit-wise "ORed" 820 with the multiple match signals MATCH1–MATCH4 822, which are outputs from the bus match circuits. The outputs 824 of the "OR" 820 are then "ANDed" 830 together. This allows the event match circuit to be configured to ignore the MATCH signals from particular bus match circuits. The output 832 of the "AND" 830 is clocked 712 into a flip-flop 840 to create a single, synchronized TRIGGER signal 842.

The don't care register 810 is loaded with an UPDATEDR-EM strobe signal 1322 from the output 852 of an event match shift register 850. This shift register is externally downloaded as described above with respect to FIG. 6. Specifically, for the first stage event match circuit, corresponding to event match 1 642 of FIG. 6, the TDI signal 1114, which is externally derived serial data, is loaded into the data input 851 of the event match shift register 850. This data is shifted into the register 850 upon assertion of SHIFTDR-EM 1324 on the shift enable input 853 of the shift register 850, synchronized to the externally derived clock signal, TCK 1117, applied to the shift register clock input 855. The EVENT MATCH DATA output 854 is the data input 851 of the second stage event match circuit, corresponding to event match 2 644 of FIG. 6. The EVENT MATCH DATA output 854 of the last state event match circuit corresponds to EVENT MATCH DATA 3 696 of FIG. 6.

One of ordinary skill in the art will recognize that many other embodiments of an event matching circuit having similar functions to the preferred embodiment disclosed above are feasible. Further, embodiments of an event matching circuit having enhanced functions are also feasible. For example, the MATCH signal shown in FIG. 7 could be latched such that it remains asserted until cleared by a reset signal, downloaded instruction or otherwise. In that manner, the TRIGGER signal shown in FIG. 8 could be generated in response to non-simultaneously occurring states occurring on multiple buses.

3. Circular Buffer Circuit

Figure 9:
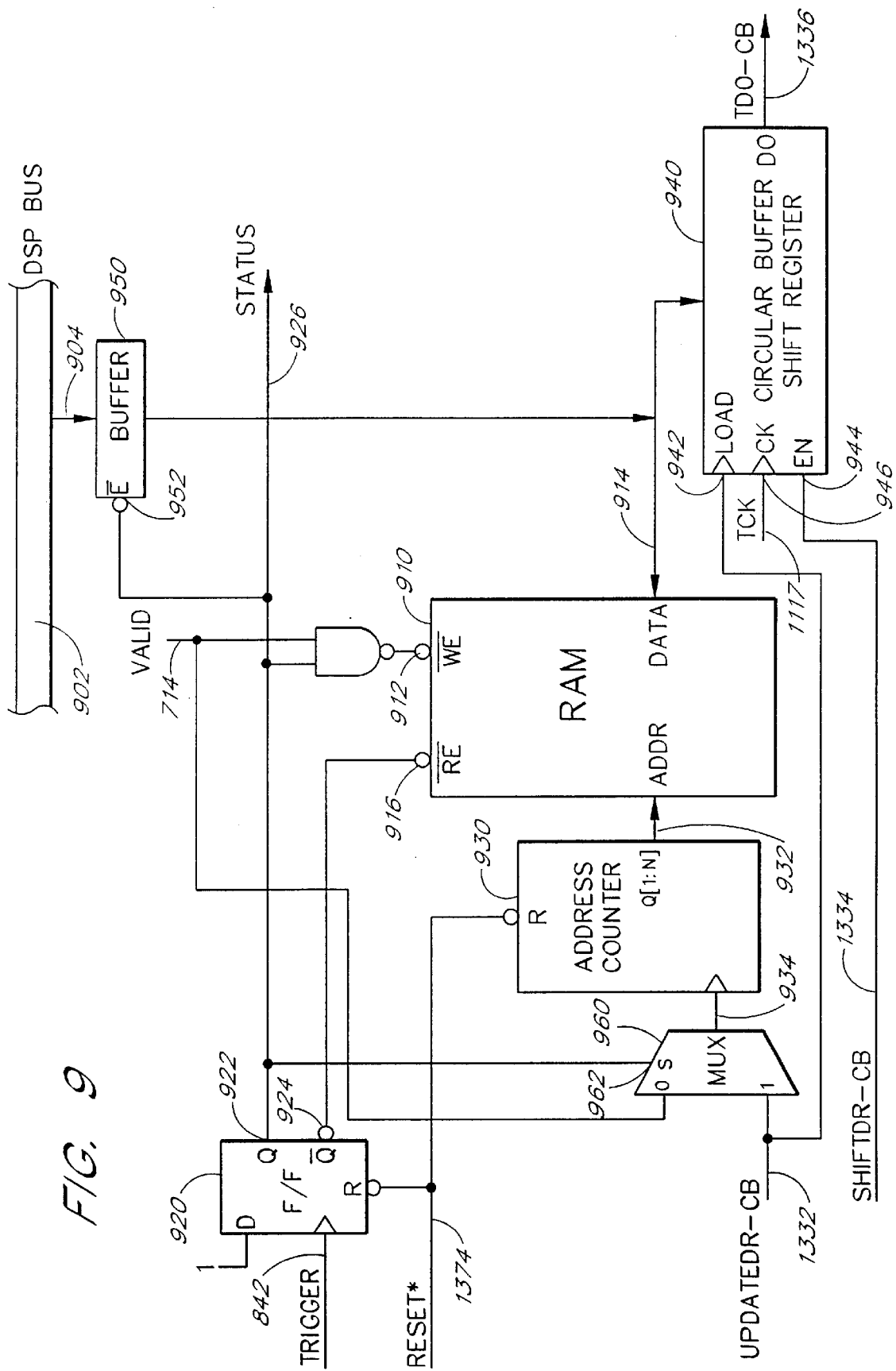
FIG. 9 is a detailed block diagram of a preferred embodiment of the circular buffer for the bus monitor.

FIG. 9 illustrates a detailed block diagram of a preferred embodiment of a circular buffer. The circular buffer provides a random access memory, RAM 910 to store bus data. The circular buffer circuitry includes a trigger flip-flop 920 which responds to the occurrence of a TRIGGER signal 842 from a corresponding event match circuit. This flip-flop controls the RAM read/write circuitry. Other circular buffer circuitry includes an address counter 930 which points to RAM data locations and a shift register 940 which loads bus data read from RAM 910 and outputs that data to an external interface.

The trigger flip-flop 920 controls whether the RAM 910 is writing or reading bus data. Upon a RESET* signal 1374 and until the occurrence of the TRIGGER signal 842, the positive asserted output, Q, 922 and negative asserted output, Q/ 924 of the trigger flip-flop 920 allow writes to RAM by enabling the VALID signal 714 to assert the RAM write enable input 912 and by asserting the enable input 952 of the tri-state buffer 950. The tri-state buffer 950 drives bus data 904 from a DSP bus 902 onto the RAM data lines 914. Upon the occurrence of the TRIGGER signal 842, the trigger flip-flop outputs 922, 924 change states to de-assert the RAM write enable input 912, de-assert the tri-state buffer enable input 952, and assert the RAM read enable input 916, disabling RAM writes and enabling RAM reads. The trigger flip-flop Q output 922 also generates an active STATUS signal 926 which can be read through the external interface as described below. The active STATUS signal 926 allows an external device to determine when a triggering event has occurred in order to initiate an upload of trace data from the circular buffer.

An address counter 930 controls the RAM address lines 932. The counter 930 increments upon the occurrence of a pulse on its clock input 934, generating addresses from the lowest RAM address to the highest RAM address. At the next count after the highest RAM address, the counter overflows to zero, causing the counter to seamlessly wrap back to the lowest RAM address. During data writes from the DSP bus 902 into RAM 910, the source of the count pulse is VALID 714 which is gated to the counter 930 via a multiplexer 960. During data reads from RAM 910, the source of the count pulse is the UPDATEDR-CB signal 1332, which is also gated to the counter 930 via a multiplexer 960. The multiplexer 960 has a select input 962, controlled by the trigger flip-flop Q output 922, which selects the count pulse source as either VALID 714 or UPDATEDR-CB 1332. As stated above, VALID 714 is DSP-derived and indicates when valid data is available on the bus. The UPDATEDR-CB signal 1332 is derived from a signal generated by the external interface, as discussed below. RAM writes are "free-running" such that the circular buffer continuously overwrites itself until the occurrence of a triggering event.

The UPDATEDR-CB signal 1332 also strobes the load input 942 of the circular buffer shift register 940, causing a parallel load of data read from RAM 910 onto the RAM data lines 914. Data loaded into the shift register 940 is serially output as the TDO-CB signal 1336 when the shift enable input 944 is asserted by the SHIFTDR-CB signal 1334. This data output is synchronous with the TCK clock signal 1117 applied to the register's shift clock input 946. SHIFTDR-CB 1334 is derived from a signal generated by the external interface, as discussed below. TCK 1117 is an externally generated clock signal and TDO-CB 1336 generates an external output signal, which are also discussed below.

Figure 10:
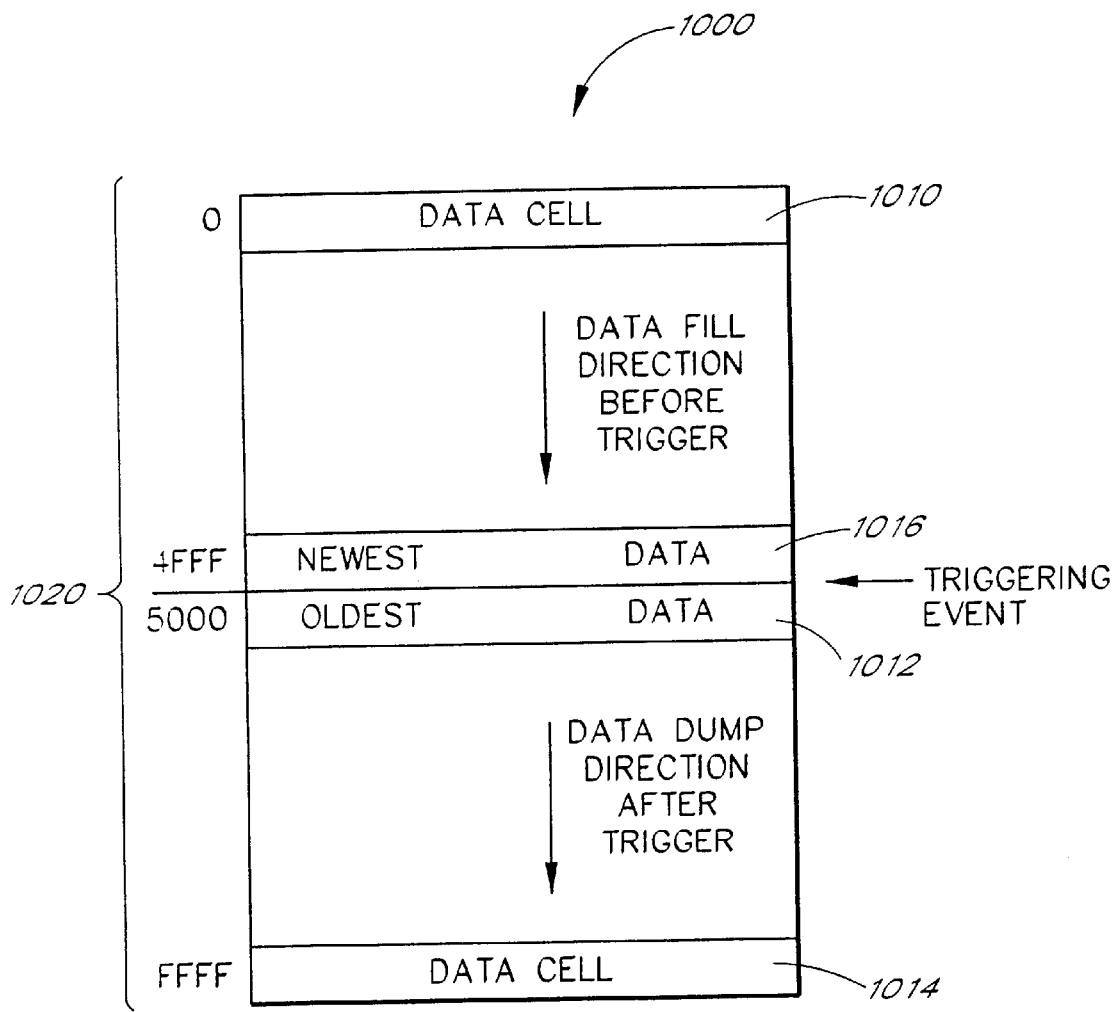
FIG. 10 is a memory map for a circular buffer illustrating the sequence of trace data storage in the buffer.

FIG. 10 illustrates how data is stored and retrieved from the circular buffer. The example shown in FIG. 10 depicts a RAM 1000 having 64K (65,536) data cells 1010 with addresses 1020 ranging from 0 to $FFFF_{16}$. Before a triggering event, bus data is continuously loaded from the lower to the higher RAM addresses, overwriting previously stored bus data. Assuming a trigger occurs after data was written to RAM address $4FFF_{16}$, then the oldest data 1012 remaining in RAM (i.e., the data written to RAM first compared with all other data remaining in RAM) is at address $5000_{16}$. Data is then read out of RAM beginning with the oldest data 1012 at address $5000_{16}$ and continuing to data 1014 at the highest memory address $FFFF_{16}$. At address $FFFF_{16}$, the address counter overflows to address 0. Data continues to be read from that data cell 1010 at address 0 through the data cell 1016 at address $4FFF_{16}$, at which point the external interface will have read the entire 64K data cells stored in RAM 1000 and will stop requesting data Thus, a 64K word data trace from a DSP bus will have been captured and uploaded, beginning with the data which occurred on the DSP bus furthest in time from the triggering event and ending with data occurring just prior in time to the triggering event.

One of ordinary skill in the art will appreciate that many other embodiments of a circular buffer having similar functions to the preferred embodiment disclosed above are feasible. Further, a circular buffer embodiment having enhanced functions from that shown is also feasible. For example, the circular buffer could be configured so that trace data is selectively captured before, after or around the occurrence of the triggering event. This function could be implemented, for example, with additional circuitry, including a counter, to selectively delay disabling the RAM write enable after the occurrence of a triggering event. In this manner, the circular buffer will continue to capture trace data for a fixed interval after the triggering event. One of ordinary skill will also recognize that other memory configurations are feasible for trace data storage, such as a first-in, first-out (FIFO) buffer.

4. External Interface a. IEEE Std 1149.1

Figure 11:
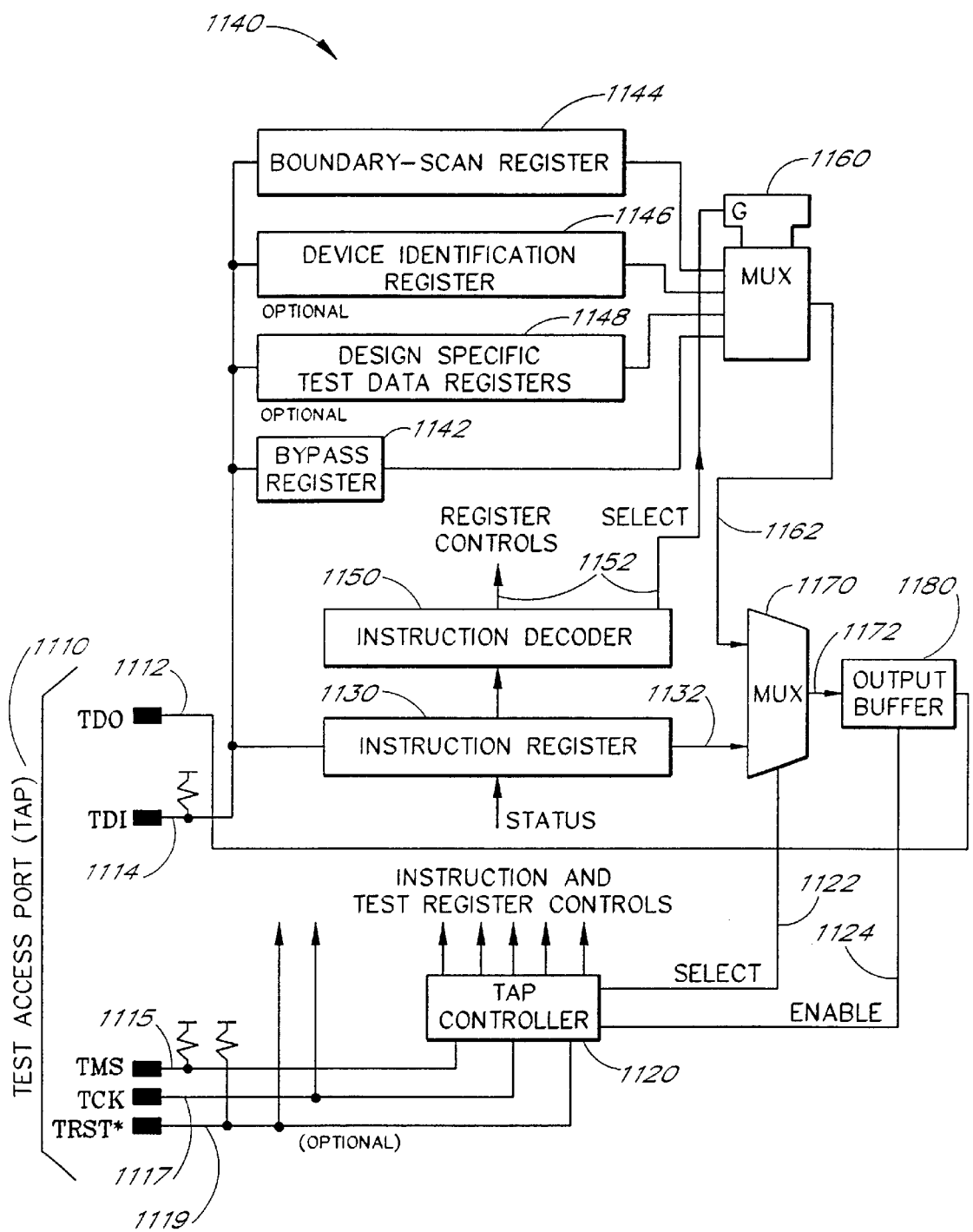
FIG. 11 is a block diagram of the prior art IEEE Std 1149.1 test access port (TAP)

The external interface allows trigger conditions to be externally loaded into the bus monitor and provides for the circular buffer contents to be externally read for analysis and display. A preferred embodiment of the external interface is based on the IEEE Standard Test Access Port and Boundary-Scan Architecture, described in IEEE Std 1149.1-1990. FIG. 11 is a detailed block diagram of the circuitry defined by IEEE Std 1149.1. The test logic shown in FIG. 11 consists of a Test Access Port (TAP) 1110, a TAP controller 1120, an instruction register 1130 and a bank of test data registers 1140.

As shown in FIG. 11, the TAP contains four signals, TDO 1112, TDI 1114, TMS 1115, TCK 1117 and an optional fifth signal, TRST* 1119 which are connected to external contacts. These signals control the operation of tests and allow serial loading and unloading of instructions and test data. The TAP 1110 provides a "diagnostic socket" which allows an external test processor to control and communicate with various test features built into an integrated circuit, circuit module or circuit board. TCK 1117 is a test clock input which is independent from the system clocks which synchronize the circuit under test. TMS 1115 is a test mode select input which controls the operation of the test logic with a binary sequence applied at this input and fed to the TAP controller 1120. TDI 1114 is a serial data input which is fed into either the instruction register or the test data registers depending on the control sequence previously applied to TMS 1115. TDO 1112 is a serial output from the test logic which is fed from either the instruction register 1130 or the test data registers 1140 depending on the control sequence previously applied to TMS 1115. Both the rising and falling edges of the TCK clock input 1117 are significant, with the rising edge used to load the TAP inputs TMS 1115 and TDI 1114 and the falling edge used to clock data through the TAP output, TDO 1112. TRST* 1119 is an optional reset input. A 0 applied to this input asynchronously forces the test logic into its reset state.

Figure 12:
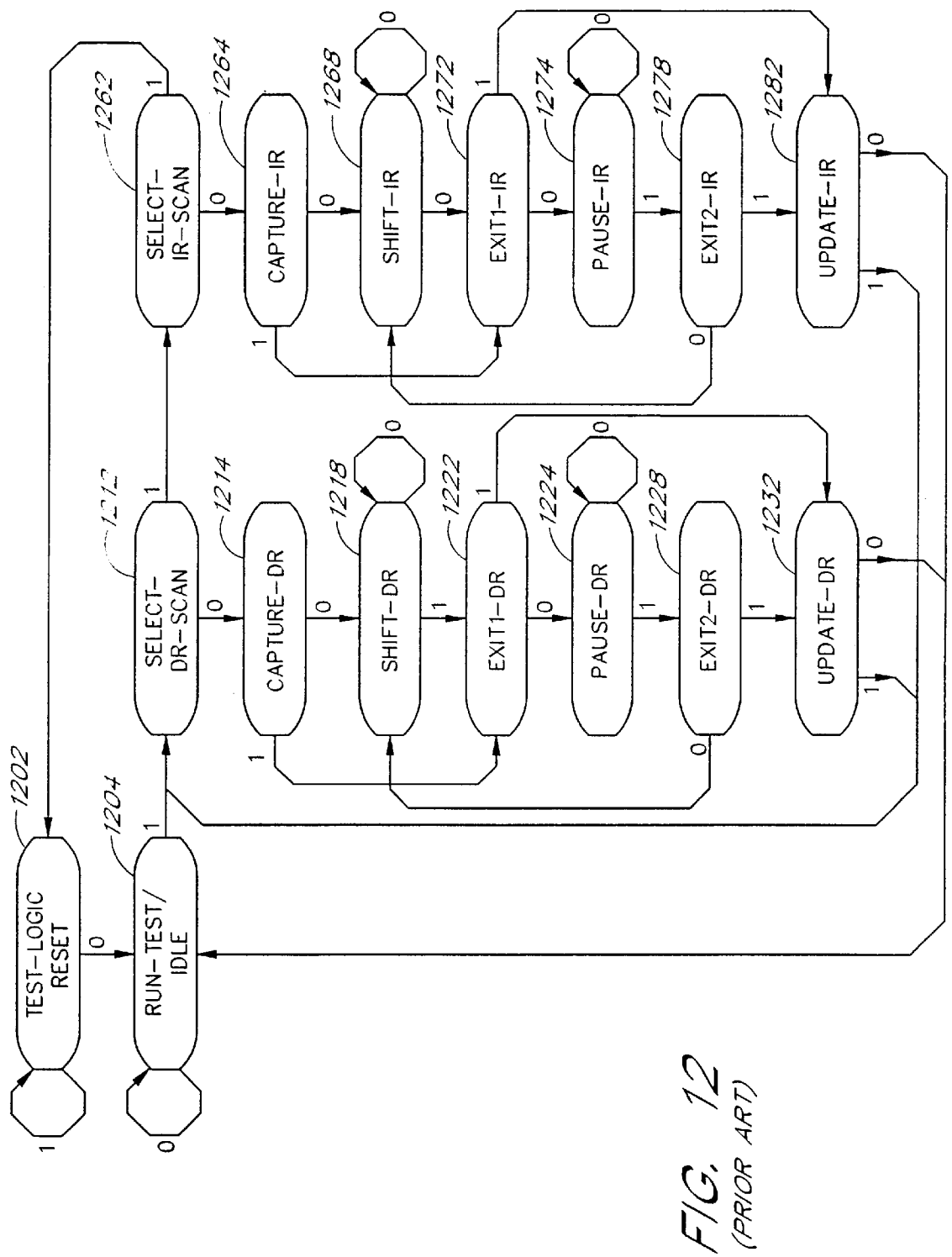
FIG. 12 is a state diagram for the controller of the prior art IEEE Std 1149.1 TAP.

Continuing to refer to FIG. 11, the TAP controller 1120 is a 16-state finite state machine that operates according to the state diagram shown in FIG. 12. As shown in FIG. 12, in the states whose names end in "-DR," the test data registers operate, while in those whose names end in "-IR," the instruction register operates. A move along a state transition arc occurs on every rising edge of TCK. The 0s and 1s shown adjacent to the state transition arcs show the value that must be present on TMS at the time of the next rising edge of TCK for the particular transition to occur. In the Test-Logic-Reset state 1202, all test logic is reset. In the Run-Test/Idle state 1204, either a self-test is run or the test logic is idle, depending on the instruction held in the instruction register. In the Capture-DR state 1214, data is loaded from the parallel input of the test data register selected by the instruction register. In the Shift-DR state 1218, data is shifted between TDI and TDO for the selected test data register. This allows previously captured data to be examined and new test input data to be entered. The Update-DR state 1232 marks the completion of the shifting process and allows the latching of the parallel outputs of the test data registers to prevent rippling of signals through the system logic while new data is shifted into the test data registers. The Capture-IR 1264, Shift-IR 1268 and Update-IR 1282 states are analogous to the Capture-DR 1214, Shift-DR 1218 and Update-DR 1232 states, respectively, but cause operation of the instruction register. By entering these states, a new instruction can be entered and applied to the test data registers or other specialized circuitry. In the remaining eight controller states, no operation of the test logic occurs. The "Pause" states 1224, 1274 allow the shifting process to be temporarily halted.

The Select—1212, 1262; Exit1—1222, 1272; and Exit2—1228, 1278 states are decision points that allow choices to be made as to the route to be followed around the controller's state diagram.

Referring back to FIG. 11, the instruction register 1130 allows test instructions to be entered into the test logic. The IEEE Std 1149.1 specifies various required and optional instructions and binary patterns for these instructions. However, these specified instructions may be supplemented with other so-called public or private instructions. The instruction decoder 1150 provides a decoder for these various instruction binary patterns, resulting in control outputs 1152 distributed to the test data registers and other test logic.

Still referring to FIG. 11, the IEEE Std 1149.1 provides for a bank of test data registers 1140. The bypass 1142 and boundary-scan registers 1144 are mandatory. The device identification register 1146 is specified but optional. Further, test data registers 1148 specific to a given design are also allowed. All test data registers 1148 operate according to the same principles. Test data registers 1148 are enabled for a particular test operation by the current instruction. Referring to FIG. 12, enabled registers will load data from their parallel inputs, if any, during the Capture-DR state 1214, will make new data available at their latched parallel outputs, if any, during the Update-DR state 1232, and will shift data from TDI to TDO during the Shift-DR state 1218.

As shown in FIG. 11, one of each of the various test data register outputs can be selected via a multiplexer 1160 according to an instruction contained in the instruction register 1130. Further, the TAP controller 1120 can select 1122 between the instruction register output 1132 and the output of a selected test data register 1162 via a second multiplexer 1170. The TAP controller 1120 also controls 1124 the TDO output buffer 1180.

b. External Interface Circuitry

Figure 13:
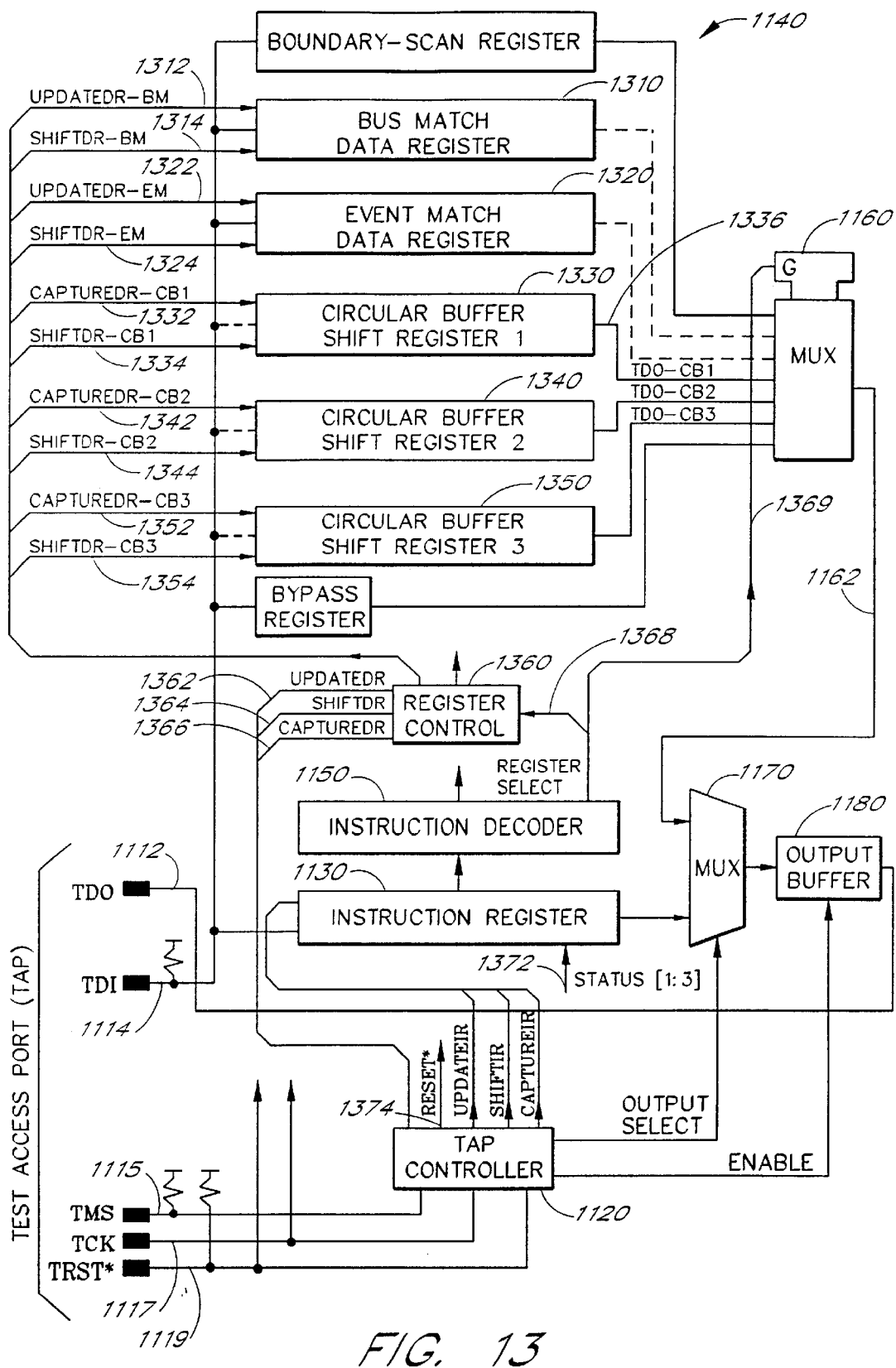
FIG. 13 is a detailed block diagram of a preferred embodiment of the external interface according to the current invention.

FIG. 13 illustrates a preferred embodiment of the external interface of the current invention. This embodiment is a serial interface based on the IEEE Std 1149.1 described above. As shown in FIG. 13, the external interface incorporates the test logic architecture illustrated in FIG. 11. The external interface also incorporates test data registers specific to this application, as provided by IEEE Std 1149.1. These test data registers are the bus match data register 1310, the event match data register 1320 and circular buffer shift registers 1–3 1330, 1340, 1350.

Functionally, the bus match data register 1310 is made-up of multiple stages of the mask register 730, bus value register 750, comparator select register 770 and bus match shift register 790, as described above with respect to FIG. 7. The event match data register 1320 is made-up of multiple stages of the don't care register 810 and event match shift register 850, as described above with respect to FIG. 8. Each of the circular buffer shift registers 1330, 1340, 1350 are the same as the circular buffer shift register 940 described above with respect to FIG. 9.

The test data registers 1140 are controlled by signals generated by the register control 1360. The inputs to the register control are UPDATEDR 1362, SHIFTDR 1364 and CAPTUREDR 1366 which correspond to the TAP controller states Update-DR 1232, Shift-DR 1218 and Capture-DR 1214 described above with respect to FIG. 12. Control signals corresponding to these register control inputs, for example UPDATEDR-BM 1312, SHIFTDR-BM 1314, UPDATEDR-EM 1322, SHIFTDR-EM 1324, CAPTUREDR-CB1 1332 and SHIFTDR-CB1 1334, are routed to the test data registers 1140 via a demultiplexer internal to the register control 1360 which responds to register select signals 1368 generated by the instruction decoder 1150. In this manner, each test data register 1140 can be selected and controlled according to an instruction downloaded to the instruction register 1130, as described above.

Referring to FIG. 13, the STATUS[1:3] input 1372 to the instruction register 1130 is from the three circular buffer circuits and comprises one STATUS signal 926 from each trigger flip-flop 920 in a circular buffer circuit, as described above with respect to FIG. 9. The instruction register can capture that status, upon TAP controller assertion of the CAPTURE-IR signal 1122, and that status can be shifted to the external interface output, TDO 1112, to be read by an external device. In this manner, an external device can detect when a trigger condition has occurred, indicating the corresponding circular buffer data is ready to be uploaded. For example, if one bit of the STATUS[1:3] input 1372 indicates that circular buffer 1 has been triggered, the external device then downloads an instruction which specifies circular buffer shift register 1 1330 to the instruction register 1130. That instruction is decoded 1150, generating a register select input 1368 to the register control 1360 and an output select signal 1369 to the multiplexer 1160 so that CAPTUREDR-CB1 and SHIFTDR-CB1 signals are input to circular buffer shift register 1 1330 and the TDO-CB1 output 1336 is switched to the multiplexer output 1162 and out to the external device via the second multiplexer 1170, the output buffer 1180 and the TAP output, TDO 1112.

FIG. 14, comprising FIGS. 14A–14M, illustrates the timing associated with initializing bus monitor trigger conditions. Table 1 lists controllers states and associated state codes. As shown in FIG. 14G, an instruction is first downloaded to the instruction register while SHIFTIR is asserted

1410. The downloaded instruction selects a specified test data register to be initialized, that is, the bus match data register or the event match data register. This instruction is loaded into the instruction register on the edge of the UPDATEIR signal 1420, shown in FIG. 14H. Next, as shown in FIG. 14J, trigger conditions are downloaded to the specified test data register while SHIFTDR is asserted 1430. These trigger conditions are latched on the edge of the UPDATEDR signal 1440, shown in FIG. 14K. Two such sequences of loading the instruction register to select a test data register and loading the specified test data register are necessary to load all stages of the bus match data register and event match data register with corresponding mask, bus value, comparator select and don't care data.

TABLE 1

Controller states and state codes.

| Controller State | Code |
|---|---|
| EXIT2-DR | 0 |
| EXIT1-DR | 1 |
| SHIFT-DR | 2 |
| PAUSE-DR | 3 |
| SELECT-IR-SCAN | 4 |
| UPDATE-DR | 5 |
| CAPTURE-DR | 6 |
| SELECT-DR-SCAN | 7 |
| EXIT2-IR | 8 |
| EXIT1-IR | 9 |
| SHIFT-IR | A |
| PUASE-IR | B |
| RUN-TEST-IDLE | C |
| UPDATE-IR | D |
| CAPUTRE-IR | E |
| TEST-LOGIC-RESET | F |

FIG. 15, comprising FIGS. 15A–15M, illustrates the timing associated with uploading bus trace data from the bus monitor after a triggering event occurs. As shown in FIG. 15F, status information is loaded into the instruction register on the edge of the CAPTUREIR signal 1510. This status information is uploaded to an external device, a pause occurs, and then an instruction is downloaded to the instruction register, as control by the SHEFTIR signal 1520, shown in FIG. 15G. The downloaded instruction selects a specified test data register to be read, that is, one of the circular buffer shift registers. This instruction is loaded into the instruction register on the edge of the UPDATEIR signal 1530, shown in FIG. 15H. Next, data is read from the selected circular buffer RAM and latched into the corresponding circular buffer shift register on the edge of the CAPTUREDR signal 1540, shown in FIG. 15I. This data is then shifted to the TDO output during assertion of the SHIFTDR signal 1550, shown in FIG. 15J. FIG. 15 illustrates two sequences of capturing RAM data and shifting data to the TDO output. One such sequence is necessary for each RAM data cell. For example, 65,536 such sequences are necessary to upload DSP bus trace data from a 64K-word RAM to an external device. The sequence of loading an instruction to select a test data register followed by multiple capture and shift sequences to read RAM is necessary to upload each triggered circular buffer in the bus monitor, as indicated by the STATUS signal.

The preferred embodiment of the external interface has been disclosed as a serial interface based upon IEEE Std 1149.1. One of ordinary skill in the art, however, will appreciate that many other embodiments of the external interface are feasible. For example, a serial interface which does not necessarily comply with IEEE Std 1149.1 could be implemented to download trigger conditions from an external device and upload bus trace data to an external device. Also, various parallel interface embodiments, although requiring more external pin-outs, could be used to transfer trigger conditions and data to and from the bus monitor of the current invention. For example, the mask, bus value, comparator select, don't care and circular buffer registers could all be implemented as parallel load, parallel output devices interconnected by a common, externally accessible bus. Appropriate control signals could then be used to transfer trigger data into and trace data out of these registers via the common bus.

C. Variations and Modifications

The bus monitoring apparatus and method according to the present invention has been disclosed in detail in connection with the preferred embodiments, but these embodiments are disclosed by way of examples only and are not to limit the scope of the present invention, which is defined by the claims that follow. One of ordinary skill in the art will appreciate many variations and modifications within the scope of this invention.

What is claimed is:

1. A system for monitoring the internal operation of a processor, said processor comprising a plurality of external contacts and one or more internal buses, said internal buses not accessible from said contacts, said system comprising:

an interface connected to at least one of said plurality of external contacts and providing a trigger condition input and a bus trace output;

a bus watching circuit having a monitor input connected to at least one of said buses, said bus watching circuit configured to generate a trigger output when a trigger condition derived from said trigger condition input compares to a trigger event occurring on said monitor input, said bus watching circuit further comprising a plurality of logic elements;

a circular buffer having a bus data input connected to at least one of said buses, said circular buffer configured to store data from said bus data input in response to said trigger output and to read data to said bus trace output; and a display device configured to read and display data stored in said circular buffer.

2. The system of claim 1, further comprising:

a plurality of circular buffers each of which may be configured to store data from one of said one or more internal buses.

3. The system of claim 1, wherein:

said bus watching circuit generates said trigger output when a predetermined state occurs on a plurality of processor buses.

4. The system of claim 1, wherein said trigger output is generated when an address detected on said monitor input falls within a predetermined range of addresses specified by said trigger condition input.

5. The system of claim 1, wherein said trigger output is generated when a first pattern of data is detected on said monitor input, said first pattern matching a second pattern specified within said trigger condition input.

6. The system of claim 5, further comprising a logic circuit adapted to identify said first pattern of data present on said monitor input and compare said first pattern to said second pattern.

7. A bus monitor co-located with a processor module, said module having a plurality of external contacts, said processor having a plurality of buses not all of which are accessible from said external contacts, said monitor comprising:

an interface means for providing a trigger condition input and a bus trace output;

a bus watching means for monitoring input connected to at least one of a plurality of buses, said bus watching means configured to generate a trigger output only when a trigger condition derived from said trigger condition input compares to a trigger event occurring on a monitor input; and a circular buffer having a means for providing a bus input connected to at least one of said buses, said circular buffer configured to continually store data from said bus data input when said trigger output is present, and to read data to said bus trace output.

8. A bus monitor co-located with a processor on a chip, circuit module or circuit board, said chip, module or board having a plurality of external contacts, said processor having a plurality of buses not all of which are accessible from said contacts, said monitor comprising:

an interface connected to at least one of said plurality of external contacts and providing a trigger condition input and a bus trace output;

a bus watching circuit having a monitor input connected to at least one of said buses, said bus watching circuit comprising a plurality of logic elements and configured to generate a trigger output when a trigger condition derived from said trigger condition input compares to a trigger event occurring on said monitor input; and a circular buffer which continuously writes data until the occurrence of said trigger output, said circular buffer having a bus data input connected to at least one of said buses and having the ability to be read from and written to via the same port, said circular buffer further being configured to store data from said bus data input in response to said trigger output and to read data to said bus trace output.

9. A bus monitor co-located with a processor on an integrated circuit, said integrated circuit having a plurality of external contacts, said processor having a plurality of buses not all of which are accessible from said contacts, said monitor comprising:

an interface connected to at least one of said plurality of external contacts and providing a trigger condition input and a bus trace output;

a bus watching circuit having a monitor input connected to at least one of said buses, said bus watching circuit configured to generate a trigger output when a trigger condition derived from said trigger condition input compares to a trigger event occurring on said monitor input, said trigger output no longer being generated when said trigger condition is no longer satisfied; and a memory having a bus data input connected to at least one of said buses, said memory having the ability to be read from and written to via the same port, and being configured to store data continually from said bus data input in response to said trigger output and to read data to said bus trace output.

10. The monitor of claim 9, wherein:

said bus watching circuit generates said trigger output when a predetermined state occurs on a plurality of processor buses.

11. The monitor of claim 9, wherein said trigger output is generated when an address detected on said monitor input falls within a predetermined range of addresses specified by said trigger condition input.

12. The monitor of claim 11, wherein said trigger output is generated when a first pattern of data is detected on said monitor input, said first pattern matching a second pattern specified within said trigger condition input.

13. A system for monitoring the internal operation of a data processing device, said processing device comprising a plurality of external contacts and one or more internal bus means, said internal bus means not accessible from said contacts, said system comprising:

interface means connected to at least one of said plurality of external contacts for providing a trigger condition input and a bus trace output;

bus watching means having a monitor input connected to at least one of said buses, said bus watching means generating a trigger output when a trigger condition derived from said trigger condition input compares to a trigger event occurring on said monitor input, said bus watching means further comprising a plurality of logic elements;

a buffer means having a bus data input connected to at least one of said buses, said buffer means storing data from said bus data input in a predetermined sequential order in response to said trigger output and to read data to said bus trace output;

means for reading data stored in said buffer means; and means for displaying said data stored in said buffer means to a user.

* * * * *

UNITED STATES PATENT AND TRADEMARK OFFICE
CERTIFICATE OF CORRECTION

PATENT NO.   : 6,618,775 B1
DATED        : September 9, 2003
INVENTOR(S)  : Henry A. Davis It is certified that error appears in the above-identified patent and that said Letters Patent is hereby corrected as shown below:

Column 2,
Lines 3-4, "with, modem processors which incorporate superscalar program execution, on-chip program and data caches and" should read -- with, modern processors which incorporate superscalar program execution, on-chip program and data caches and --
Lines 18-22, "Performance improvements in modem processors, such as increased clock rates and internal clock multiplication, also make debugging these embedded systems more difficult. The high frequency signals of many modem processors cannot tolerate the capacitance associated with pod or probe assemblies and their associated cabling. Further, modem" should read -- Performance improvements in modern processors, such as increased clock rates and internal clock multiplication, also make debugging these embedded systems more difficult. The high frequency signals of many modern processors cannot tolerate the capacitance associated with pod or probe assemblies and their associated cabling. Further, modern --

Signed and Sealed this

Fifteenth Day of June, 2004

JON W. DUDAS
*Acting Director of the United States Patent and Trademark Office*